(12) United States Patent
Ishii et al.

(10) Patent No.: US 10,496,889 B2
(45) Date of Patent: Dec. 3, 2019

(54) INFORMATION PRESENTATION CONTROL APPARATUS, AUTONOMOUS VEHICLE, AND AUTONOMOUS-VEHICLE DRIVING SUPPORT SYSTEM

(71) Applicant: Panasonic Intellectual Property Corporation of America, Torrance, CA (US)

(72) Inventors: Yasunori Ishii, Osaka (JP); Kazuki Kozuka, Osaka (JP); Ryota Fujimura, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 168 days.

(21) Appl. No.: 15/482,842

(22) Filed: Apr. 10, 2017

(65) Prior Publication Data

US 2017/0300762 A1 Oct. 19, 2017

(30) Foreign Application Priority Data

Apr. 15, 2016 (JP) .................................. 2016-082105
Dec. 26, 2016 (JP) .................................. 2016-252131

(51) Int. Cl.
*G06K 9/00* (2006.01)
*B60R 1/00* (2006.01)
(Continued)

(52) U.S. Cl.
CPC ............ *G06K 9/00791* (2013.01); *B60R 1/00* (2013.01); *G01C 21/26* (2013.01); *G06F 3/04883* (2013.01); *G06K 9/00979* (2013.01); *G06K 9/00993* (2013.01); *B60K 2370/172* (2019.05); *B60K 2370/175* (2019.05);
(Continued)

(58) Field of Classification Search
None
See application file for complete search history.

(56) References Cited

U.S. PATENT DOCUMENTS 9,881,482 B2 * 1/2018 Kleen ................... B62D 1/00
2010/0110523 A1 * 5/2010 Varaprasad ............ B60R 1/089
359/273
(Continued)

FOREIGN PATENT DOCUMENTS

JP 6-195595 7/1994

*Primary Examiner* — Tahmina N Ansari
(74) *Attorney, Agent, or Firm* — Greenblum & Bernstein, P.L.C.

(57) ABSTRACT

An information presentation control apparatus includes a selection information obtainer and a presentation controller. The selection information obtainer obtains selection information representing a selection status of a plurality of recognizers that recognize different targets in surroundings of an autonomous vehicle. The presentation controller causes a presentation device mounted in the autonomous vehicle to present driving information in accordance with the selection information, the driving information being based on at least one of control that is executable by the autonomous vehicle and control that is not executable by the autonomous vehicle and being information about at least one of driving by an automated driving system of the autonomous vehicle and driving by a driver.

17 Claims, 16 Drawing Sheets

(51) Int. Cl.
*G01C 21/26* (2006.01)
*G06F 3/0488* (2013.01)
*B60W 50/14* (2012.01)
*G01S 19/42* (2010.01)
*G05D 1/00* (2006.01)
*G05D 1/02* (2006.01)

(52) U.S. Cl.
CPC .... *B60R 2300/60* (2013.01); *B60W 2050/146* (2013.01); *B60W 2540/22* (2013.01); *B60W 2550/12* (2013.01); *B60W 2550/141* (2013.01); *B60W 2550/40* (2013.01); *G01S 19/42* (2013.01); *G05D 1/0088* (2013.01); *G05D 1/0246* (2013.01)

(56) References Cited

U.S. PATENT DOCUMENTS

| | | | | |
|---|---|---|---|---|
| 2010/0245802 | A1* | 9/2010 | Madhani | G01S 7/4814 356/5.05 |
| 2015/0234382 | A1* | 8/2015 | Ju | G01S 7/003 701/23 |
| 2015/0371527 | A1* | 12/2015 | Kleen | B62D 1/00 340/457 |
| 2017/0113686 | A1* | 4/2017 | Horita | B60W 50/14 |
| 2017/0300762 | A1* | 10/2017 | Ishii | B60R 1/00 |
| 2018/0113474 | A1* | 4/2018 | Koda | G08G 1/09 |

\* cited by examiner

FIG. 3

| CODE | TYPE OF SITUATION | ABNORMALITY LEVEL | SELECTION RULE |
|---|---|---|---|
| 01-001 | COMMUNICATION FAULT | — | NOT PERFORM RECOGNITION (RECOGNITION UNIT OUTSIDE OF VEHICLE) |
| 02-010 | FAILURE: SENSOR 1 | — | NOT PERFORM RECOGNITION (RECOGNITION UNIT 01) |
| 02-020 | FAILURE: SENSOR 2 | A | NOT PERFORM RECOGNITION (RECOGNITION UNIT 02) |
| 02-021 | FAILURE: SENSOR 2 | B | NOT PERFORM RECOGNITION (RECOGNITION UNIT 02, RECOGNITION UNIT 03) |
| ... | ... | ... | ... |
| 03-010 | LOW BATTERY CHARGE | A | NOT PERFORM RECOGNITION (RECOGNITION UNIT 04, RECOGNITION UNIT 05) PERFORM RECOGNITION (RECOGNITION UNIT 02, RECOGNITION UNIT 03) |
| ... | ... | ... | ... |

FIG. 5

| RECOGNITION UNIT | CONTROL POSSIBLE WHEN RECOGNITION IS PERFORMED | INFORMATION 1 PRESENTED WHEN RECOGNITION IS PERFORMED | ... | INFORMATION 2 PRESENTED WHEN RECOGNITION IS PERFORMED | ... | INFORMATION 1 PRESENTED WHEN RECOGNITION IS NOT PERFORMED | ... |
|---|---|---|---|---|---|---|---|
| RECOGNITION UNIT OUTSIDE OF VEHICLE | | | ... | | ... | | ... |
| RECOGNITION UNIT 01 | RUSH PREDICTION (BRAKING, STEERING) | imgRushPred | ... | txtRushPred | ... | msgNoRushPred | ... |
| RECOGNITION UNIT 02 | LANE KEEP (STEERING) | imgLaneKeep | ... | txtLaneKeep | ... | msgNoLaneKeep | ... |
| RECOGNITION UNIT 03 | COLLISION PREVENTION, DISTANCE KEEP (BRAKING) | imgFwdDist | ... | txtFwdDist | ... | msgNoFwdDist | ... |
| | ROAD SURFACE KEEP (DRIVING, BRAKING, STEERING) | imgSfcKeep | ... | txtSfcKeep | ... | msgNoSfcKeep | ... |
| ... | ... | ... | ... | ... | ... | ... | ... |
| RECOGNITION UNIT 05 | OBSTACLE AVOIDANCE (BRAKING, STEERING) | imgObjAvd | ... | txtObjAvd | ... | msgNoObjAvd | ... |
| RECOGNITION UNIT 06 | PERSON AVOIDANCE (BRAKING, STEERING) | imgPsnAvd | ... | txtPsnAvd | ... | msgNoPsnAvd | ... |
| RECOGNITION UNIT 07 | SPEED LIMIT (DRIVING, BRAKING) | imgSpdLmt | ... | txtSpdLmt | ... | msgNoSpdLmt | ... |
| ... | ... | ... | ... | ... | ... | ... | ... |

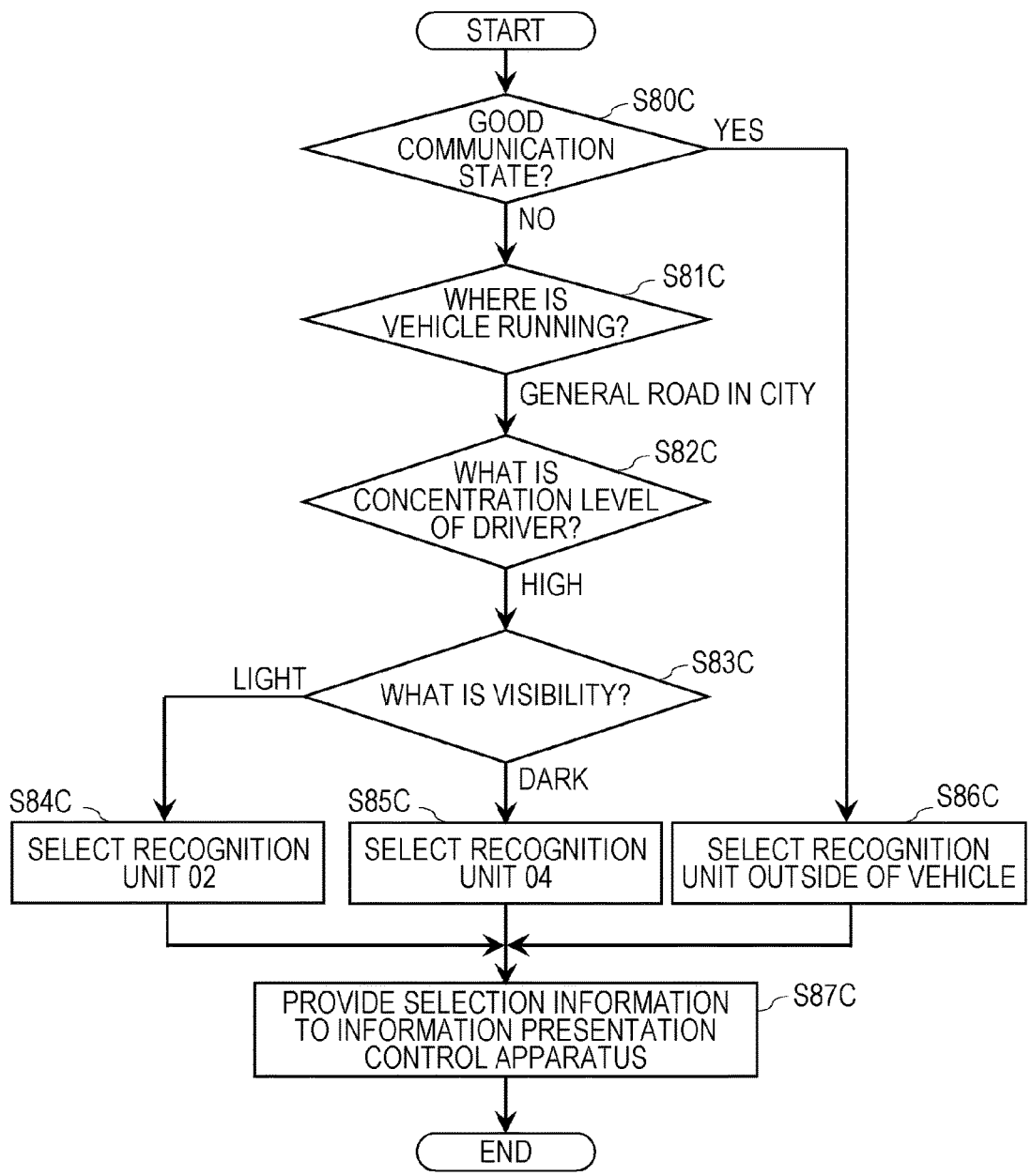

INFORMATION PRESENTATION CONTROL APPARATUS, AUTONOMOUS VEHICLE, AND AUTONOMOUS-VEHICLE DRIVING SUPPORT SYSTEM

BACKGROUND

1. Technical Field

The present disclosure relates to an autonomous vehicle or the like that drives under automated driving control in accordance with surroundings detected by an in-vehicle sensor.

2. Description of the Related Art

Among the technologies regarding automobiles, there is a technology regarding a display device that obtains, using various types of in-vehicle sensors, running environment information, which is information about a running environment of a vehicle, and that provides a driver with information useful to driving in accordance with the running status of the vehicle (see Japanese Unexamined Patent Application Publication No. 6-195595).

SUMMARY

In one general aspect, the techniques disclosed here feature an information presentation control apparatus including a selection information obtainer and a presentation controller. The selection information obtainer obtains selection information representing a selection status of a plurality of recognizers that recognize different targets in surroundings of an autonomous vehicle. The presentation controller causes a presentation device mounted in the autonomous vehicle to present driving information in accordance with the selection information. The driving information is based on at least one of control that is executable by the autonomous vehicle and control that is not executable by the autonomous vehicle and is information about at least one of driving by an automated driving system of the autonomous vehicle and driving by a driver.

It should be noted that general or specific embodiments may be implemented as a system, a method, an integrated circuit, a computer program, a computer-readable recording medium such as a compact disc-read only memory (CD-ROM), or any selective combination thereof.

An information presentation control apparatus according to an embodiment of the present disclosure is able to notify a driver of an autonomous vehicle of the details of driving that is to be performed by the driver.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 illustrates an example of data referred to by a selection unit included in the information presentation control apparatus according to the embodiment;

FIG. 5 illustrates an example of data referred to by the information presentation control apparatus according to the embodiment in order to obtain data of information to be presented to a driver;

FIG. 11C is a flowchart illustrating an example of an operation of the selection unit according to the modification example of the embodiment;

DETAILED DESCRIPTION

Figure 1:
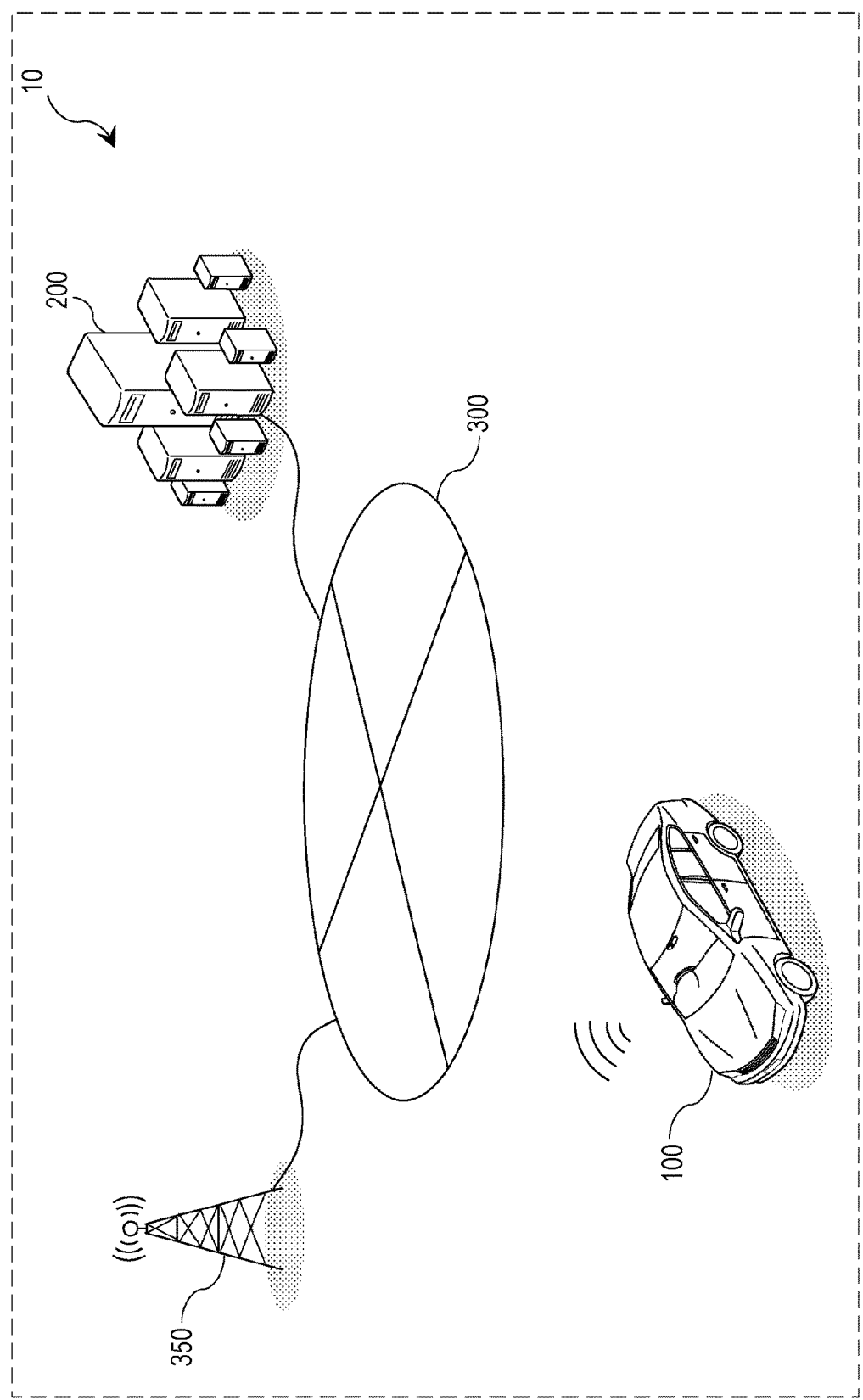
FIG. 1 is a schematic diagram illustrating the configuration of a network including an autonomous vehicle including an information presentation control apparatus according to an embodiment.

Underlying Knowledge Forming Basis of the Present Disclosure

The inventors of the present disclosure found that the following issues occur regarding the display device described above in "Description of the Related Art."

In an automobile, information obtained using an in-vehicle sensor is also used for so-called electronic control performed by an in-vehicle electronic control unit (ECU). However, a driver is not always notified of the details of electronic control that has actually been performed in the automobile which the driver is driving or of the change in operation of the automobile caused by the electronic control.

In an autonomous vehicle having an automated driving function implemented by further advanced electronic control, the details of automated driving change according to the operation status of an in-vehicle sensor. For example, in an autonomous vehicle that is running, if there is a glitch in a sensor that detects the situation ahead of the vehicle, the driver of the vehicle needs to know a target (for example, a person, road sign, road marking, obstacle, or another passing vehicle) that the vehicle is unable to recognize to perform control based on a recognition result, that is, the driver needs to know the driving action to be performed by himself/herself (recognition, estimation, judgment, or operation).

An autonomous vehicle having a function of communicating with the outside transmits information representing surroundings detected by an in-vehicle sensor to an external recognition apparatus, such as a recognition system constructed as a large-scale neural network. The neural network, in which machine learning by deep learning is performed, is capable of recognizing more classes with higher accuracy than an in-vehicle and light-weight recognition apparatus. The autonomous vehicle receives information representing a target recognized by the recognition system on the basis of the surroundings and performs automated driving in accordance with the information. However, in some places, the speed of communication between the autonomous vehicle and the outside does not reach the level required for automated driving. In this case, the result of recognition by the large-scale neural network is not usable for automated driving and thus the details of automated driving change. Thus, when the communication speed of the autonomous vehicle is low, the driver needs to know the details of driving to be performed by himself/herself in that situation.

However, in the display device according to the related art, change in the recognition apparatus and change in the target to be recognized due to the change in the recognition apparatus are not taken into consideration. Thus, the driver of an autonomous vehicle is not notified of the details of driving that changes in accordance with the change in the target and that is to be performed by the driver.

An information presentation control apparatus according to an aspect of the present disclosure includes: a selection information obtainer that obtains selection information representing a selection status of a plurality of recognizers that recognize different targets in surroundings of an autonomous vehicle; and a presentation controller that causes a presentation device mounted in the autonomous vehicle to present driving information in accordance with the selection information, the driving information being based on at least one of control that is executable by the autonomous vehicle and control that is not executable by the autonomous vehicle and being information about at least one of driving by an automated driving system of the autonomous vehicle and driving by a driver.

Accordingly, information about driving performed by the automated driving system or a driving action to be performed by the driver (driving information) that changes according to an in-vehicle status of the autonomous vehicle can be provided to the driver.

For example, the selection status of the plurality of recognizers may be a status of selection of a recognizer that performs recognition of a target or a recognizer that does not perform recognition of a target from among the plurality of recognizers.

Accordingly, the information presentation control apparatus is able to provide driving information to the driver on the basis of information representing a target that is recognized or a target that is not recognized in the automated driving system.

For example, the selection information obtainer may obtain, from the automated driving system, the selection information representing a result of selection of a recognizer from among the plurality of recognizers.

Accordingly, the information presentation control apparatus is able to provide driving information to the driver on the basis of an actual selection status of a recognizer in the automated driving system.

For example, the selection information obtainer may obtain selection judgment criterion information that is to be used for judgment for selecting a recognizer from among the plurality of recognizers and may obtain the selection information by estimating the selection status on the basis of the selection judgment criterion information. Alternatively, for example, the selection information obtainer may obtain information representing an operation status of a detector or a communicator included in the autonomous vehicle, the information being for obtaining information used for recognizing a target, and may obtain the selection information by judging, on the basis of the information representing the operation status, a recognizer to be selected.

Accordingly, the information presentation control apparatus is able to obtain selection information without waiting for selection of a recognizer by a selector in the automated driving system, and is able to quickly provide driving information to the driver. Also, the cost can be reduced because the selection information can be obtained without providing an interface for the automated driving system.

For example, the selection judgment criterion information may include running location information representing a characteristic of a location where the autonomous vehicle is running, the running location information being obtained on the basis of map information.

Accordingly, the information presentation control apparatus is able to provide driving information to the driver if a change that changes the details of driving by the automated driving system occurs in the running location of the autonomous vehicle.

For example, the selection judgment criterion information may include driver condition information representing a physical condition of the driver.

Accordingly, the information presentation control apparatus is able to provide driving information to the driver if a change that changes the details of driving by the automated driving system occurs in the physical condition of the driver.

For example, the selection judgment criterion information may include outside-vehicle-environment information representing an environment outside of the autonomous vehicle.

Accordingly, the information presentation control apparatus is able to provide driving information to the driver if a change that changes the details of driving by the automated driving system occurs in the environment outside of the vehicle.

For example, the information representing the operation status may include information representing an abnormality of a sensor included in the detector, and the recognizer that does not perform recognition of a target may include a recognizer that uses a detection result output from the sensor having the abnormality to recognize a target. Alternatively, for example, the information representing the operation status may include information representing communication quality of the communicator or whether or not the communicator is performing communication, and the recognizer that does not perform recognition of a target may include a recognizer configured to use information communicated by the communicator to recognize a target in a situation where the communication quality of the communicator is lower than predetermined quality or a situation where the communicator is not performing communication.

Accordingly, the information presentation control apparatus is able to provide, to the driver, driving information reflecting a selection status of a recognizer that is selected in accordance with whether or not information necessary to recognize a target has been obtained.

For example, the presentation controller may control presentation of the driving information to the driver, the presentation being performed using at least one of a sound and an image.

Accordingly, the information presentation control apparatus is able to present driving information to the driver who is driving as needed, by using a sound, a moving image, a still image, an indicator light, or any selective combination thereof.

For example, the driving information may be information including details of driving that the automated driving system does not perform or is not performing.

Accordingly, the information presentation control apparatus is able to explicitly present the driving action to be performed by the driver.

An autonomous-vehicle driving support system according to an aspect of the present disclosure includes: the foregoing automated driving system; and the foregoing information presentation control apparatus.

Accordingly, the driver of the autonomous vehicle is able to know, as needed, the driving action that is to be performed by the driver and that changes in accordance with an in-vehicle status.

An autonomous vehicle according to an aspect of the present disclosure includes: the foregoing automated driving system; and the foregoing information presentation control apparatus.

In the autonomous vehicle, the driver is notified of, as needed, the driving action that is to be performed by the driver and that changes in accordance with the status of the vehicle or the driver.

It should be noted that general or specific embodiments may be implemented as a system, a method, an integrated circuit, a computer program, a computer-readable recording medium such as a compact disc-read only memory (CD-ROM), or any selective combination thereof.

Hereinafter, embodiments will be described in detail with reference to the attached drawings.

The embodiments described below are encompassing or specific examples. The values, shapes, materials, components, locations and connection states of the components, steps, and the order of steps described in the following embodiments are examples and do not limit the present disclosure. Among the components according to the following embodiments, a component that is not described in an independent claim representing the broadest concept will be described as an optional component.

Embodiment

FIG. 1 is a schematic diagram illustrating the configuration of a network including an autonomous vehicle including an information presentation control apparatus according to an embodiment.

An autonomous vehicle 100 is one of nodes of a network 10. In the network 10, the autonomous vehicle 100 is able to use a recognition system 200, which is outside the autonomous vehicle 100, to recognize surroundings during automated driving.

The recognition system 200 is a system that has performed machine learning, such as deep learning using a neural network, support vector machine, or Boosting, and is capable of image recognition of many classes with high accuracy. The recognition system 200 is outside the autonomous vehicle 100 and is one of recognition units that are used for automated driving by the autonomous vehicle 100. The details will be described below.

The autonomous vehicle 100 and the recognition system 200 communicate with each other through a communication line 300, such as the Internet.

The autonomous vehicle 100 transmits information representing the surroundings of the autonomous vehicle 100, detected by an in-vehicle sensor (described below), to a base station 350. The information is then transmitted to the recognition system 200 through the communication line 300. The information is transmitted as, for example, data of an image showing the surroundings of the autonomous vehicle 100 photographed by an in-vehicle camera (image sensor), to the recognition system 200.

The recognition system 200 recognizes, on the basis of the received information, the presence, direction, distance, motion, and other characteristics of persons or objects around the autonomous vehicle 100, and transmits information representing the recognition result to the autonomous vehicle 100. For example, the recognition system 200 that has received the foregoing image data performs image recognition to recognize a target in the image, such as a person, road sign, road marking, obstacle, or another passing vehicle, and transmits information representing the target to the autonomous vehicle 100 through the communication line 300.

In the autonomous vehicle 100 that has received the information, an automated driving system (described below) included in the autonomous vehicle 100 controls various systems such as an accelerator, brake, and steering, on the basis of the information.

Figure 2:
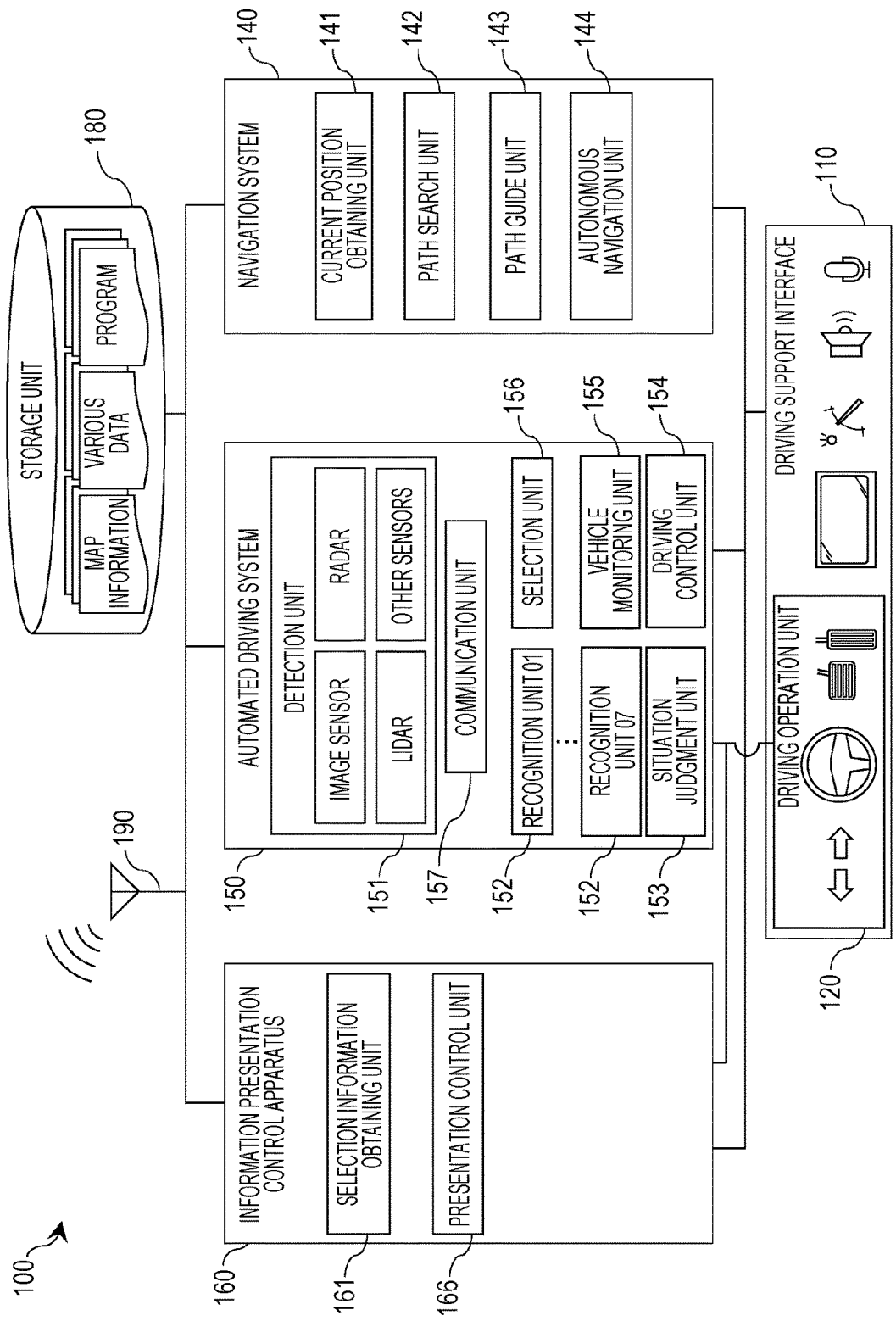
FIG. 2 is a functional block diagram illustrating the functional configuration of the autonomous vehicle.

FIG. 2 is a functional block diagram illustrating the functional configuration of the autonomous vehicle 100. The power source of the autonomous vehicle 100 is not limited, and may be any of only an engine powered by fuel, only a motor powered by electric power, and both the engine and motor (hybrid).

The autonomous vehicle 100 includes a driving support interface 110, a navigation system 140, an automated driving system 150, an information presentation control apparatus 160, a storage unit 180, and an antenna 190.

The driving support interface 110 is an interface between the autonomous vehicle 100 and a driver who is a user of the autonomous vehicle 100, and is a component that receives an input from the driver and presents information to the driver. For example, the driving support interface 110 includes a driving operation unit 120, which includes an accelerator, a brake, and a steering wheel operated by the driver of the autonomous vehicle 100; a display device including a display; meters; indicator lights; a speaker; a microphone; a touch panel; and buttons. Among these components, a component that is able to present information to the driver through his/her sense of sight, hearing, or touch is referred to as a presentation device. For example, the display device, meters, indicator lights, speaker, steering wheel, and pedals may serve as a presentation device. The steering wheel and pedals are able to attract attention of the driver by, for example, vibrating when a predetermined condition is satisfied.

In this embodiment, a driving system, a braking system, and a steering system that are controlled through an operation of the driving operation unit 120 are also included in the driving operation unit 120.

The storage unit 180 is a storage device that stores map information (described below), other various pieces of data, and programs that are referred to by the navigation system 140, the automated driving system 150, and the information presentation control apparatus 160 to perform processes. The storage unit 180 is formed of, for example, a recording medium such as a hard disk, a semiconductor memory, or a digital versatile disc (DVD), or any selective combination thereof.

The antenna 190 is used for information communication with the outside of the autonomous vehicle 100, performed by the navigation system 140, the automated driving system 150, and the information presentation control apparatus 160. The information communication performed by these components may include reception from an artificial satellite of a satellite positioning system, reception from Vehicle Information and Communication System (VICS, registered trademark) or Intelligent Transport Systems (ITS), and various types of communication such as Internet communication.

The driving support interface 110, the storage unit 180, and the antenna 190 illustrated in FIG. 2 may be shared by and accessed by the navigation system 140, the automated driving system 150, and the information presentation control apparatus 160, but the embodiment is not limited thereto. However, even if there are driving support interfaces, storage units, and antennas that are respectively used by the navigation system 140, the automated driving system 150, and the information presentation control apparatus 160 in a dedicated manner, FIG. 2 illustrates them collectively as the driving support interface 110, the storage unit 180, and the antenna 190 included in the autonomous vehicle 100.

The navigation system 140 obtains a current position of the autonomous vehicle 100, searches for a path to a destination, and guides the driver to the destination. The navigation system 140 includes a current position obtaining unit 141, a path search unit 142, a path guide unit 143, and an autonomous navigation unit 144.

The current position obtaining unit 141 obtains a current position on the basis of signals received from an artificial satellite of a satellite positioning system, such as a global positioning system (GPS) satellite, through the antenna 190, and signals representing acceleration, angular velocity, and vehicle speed received from the autonomous navigation unit 144 (described below).

The path search unit 142 calculates one or more paths from a current position to a destination.

The path guide unit 143 guides the driver, using an image or voice output through the driving support interface 110, to a destination along a path that has been found by the path search unit 142 and selected by the driver.

The autonomous navigation unit 144 includes an acceleration sensor, a gyro sensor, and a vehicle speed meter, and transmits, to the current position obtaining unit 141, signals representing the acceleration, angular velocity, and vehicle speed of the autonomous vehicle 100 that are measured and obtained by the acceleration sensor, the gyro sensor, and the vehicle speed meter.

The current position obtained by the current position obtaining unit 141, the path found by the path search unit 142, and the guidance provided by the path guide unit 143 are presented to the driver through the driving support interface 110, together with map information and traffic information obtained from the storage unit 180 or from the outside of the autonomous vehicle 100 through the antenna 190.

The current position obtaining unit 141, the path search unit 142, the path guide unit 143, and the autonomous navigation unit 144 described above are components that are implemented when the ECU of the navigation system 140 reads and executes a program and obtains data from a sensor as necessary or refers to the data stored in the storage unit 180, such as map information.

The automated driving system 150 includes a detection unit 151, recognition units 152, a situation judgment unit 153, a driving control unit 154, a vehicle monitoring unit 155, a selection unit 156, and a communication unit 157.

The detection unit 151 is formed of various types of sensors that detect the surroundings of the autonomous vehicle 100. Examples of the various types of sensors include an image sensor, a radar, and a lidar. These sensors output data such as images representing detected surroundings, reflected waves, reflected light, or the like.

The recognition units 152 recognize a target in the surroundings on the basis of the data output from the detection unit 151.

In the example illustrated in FIG. 2, the automated driving system 150 includes a plurality of recognition units 152, which recognize different targets. Here, "recognition of different targets" means that the targets to be recognized are different, for example, a certain recognition unit 152 recognizes a road marking around the autonomous vehicle 100, whereas another recognition unit 152 recognizes another passing body. In another example, a certain recognition unit 152 recognizes a certain position of a recognized object (direction and distance), another recognition unit 152 recognizes the motion of the recognized object (speed and direction), and still another recognition unit 152 predicts the motion of the recognized object. In other words, the individual recognition units 152 play different roles to recognize the surroundings.

The automated driving system 150 is able to use the recognition system 200 (see FIG. 1), which is outside the vehicle, as a recognition unit in addition to the recognition units 152 mounted in the vehicle. The recognition system 200 recognizes a target in surroundings on the basis of data that is obtained from the detection unit 151 and is transmitted by the automated driving system 150 through the communication unit 157. The recognition system 200 recognizes a target different from the targets recognized by the individual recognition units 152. Even if the target recognized by the recognition system 200 is the same as that recognized by the recognition units 152, the recognition system 200 is able to perform more advanced recognition. The more advanced recognition means that, for example, the recognition unit 152 recognizes a person and a position of the person from image data, whereas the recognition system 200 specifies, from the same image data, the age, behavior, belongings, or the like of the person. In another example, the recognition unit 152 recognizes a road sign and a position of the road sign from image data, whereas the recognition system 200 specifies, from the same image data, the instruction of the road sign. Such a difference in the recognized target is also an example of "recognition of different targets" according to the embodiment.

The targets of recognition performed by the individual recognition units 152 and the recognition system 200 may be partially overlapped for the purpose of ensuring redundancy from the viewpoint of safety.

The situation judgment unit 153 predicts danger on the basis of a result of recognition performed by the recognition unit 152 or the recognition system 200, and judges whether or not an operation of the driving operation unit 120 by the driver is suitable for the current or predicted situation as necessary. Also, the situation judgment unit 153 judges, on the basis of the result of the prediction of danger or judgement of suitability, whether or not the automated driving system 150 is to operate the driving operation unit 120, and determines the details of the operation if the automated driving system 150 is to operate the driving operation unit 120. For example, the situation judgment unit 153 judges the position in a lateral direction of the autonomous vehicle 100 in a lane on the basis of surroundings information representing the distances from the vehicle to white lines on the right and left of the lane. If the autonomous vehicle 100 has been within a range at a certain distance from one of the white lines for a predetermined period, the situation judgment unit 153 judges to perform an operation of the steering system for moving the autonomous vehicle 100 toward the center of the lane and determines the details of the operation.

The driving control unit 154 transmits a control signal for performing the operation determined by the situation judgment unit 153 to the driving operation unit 120. In the driving operation unit 120 that has received the control signal, the driving system, the braking system, and the steering system of the autonomous vehicle 100 operate in accordance with the control signal, and also the steering and individual pedals operate as necessary.

The vehicle monitoring unit 155 monitors the state of the autonomous vehicle 100 constantly (or at a very short interval of milliseconds). The targets to be monitored include, for example, the various types of sensors included in the detection unit 151 or the communication unit 157. More specifically, the vehicle monitoring unit 155 monitors the operation status of the sensors or the communication unit 157, for example, whether or not the sensors or the communication unit 157 has a failure.

Also, the vehicle monitoring unit 155 may monitor the speed of communication with the individual sensors or whether or not a connection to the individual sensors has been established, and the communication quality of the communication unit 157 (for example, the communication speed, whether or not a connection for communication has been established, or communication stability) or whether or not communication is performed. For example, the vehicle monitoring unit 155 monitors whether or not the communication speed is higher than or equal to a threshold that is determined in accordance with the amount of data that is transmitted/received from when the surroundings are detected to when driving control is performed and the processing speed thereof.

Furthermore, the vehicle monitoring unit 155 may monitor the statuses of components of the autonomous vehicle 100 that may have an influence on the operation of the individual sensors or the communication unit 157. For example, the vehicle monitoring unit 155 may monitor the remaining battery charge of the autonomous vehicle 100 and the amount of consumption of the resources of the automated driving system 150.

The vehicle monitoring unit 155 performs the foregoing monitoring by, for example, extracting information about the state of the individual in-vehicle apparatuses or the autonomous vehicle 100 (state information) from control information about the in-vehicle apparatuses transmitted through a controller area network (CAN, not illustrated) provided in the autonomous vehicle 100 (the control information is referred to as CAN information).

The vehicle monitoring unit 155 provides information representing the operation status to the selection unit 156 as needed.

On the basis of the information provided from the vehicle monitoring unit 155, the selection unit 156 selects, from among the recognition units 152 and the recognition system 200, a recognition unit that performs recognition of a target or a recognition unit that does not perform recognition of a target.

For example, during a period when the speed of communication with the recognition system 200 is higher than or equal to the foregoing threshold, the selection unit 156 selects the recognition system 200 as a recognizer that performs recognition of a target. If the information representing the operation status indicates a failure of one of the sensors, the selection unit 156 selects, from among the recognition units 152 and the recognition system 200, a recognition unit that performs recognition by using data output from the sensor having a failure as a recognition unit that does not perform recognition of a target. Also, the selection unit 156 selects, from among the recognition units 152 and the recognition system 200, recognition units other than the foregoing recognition unit as recognition units that perform recognition of a target.

The selection unit 156 performs the above-described selection in accordance with a predetermined rule. The predetermined rule is included in, for example, the various pieces of data stored in the storage unit 180. When notified, by the vehicle monitoring unit 155, of a code indicating a predetermined operation state of a sensor, the selection unit 156 obtains the rule corresponding to the code with reference to the data and selects a recognition unit in accordance with the rule.

FIG. 3 is a diagram illustrating an example of the data. In the example illustrated in FIG. 3, in the case of communication fault (code: 01-001), the recognition unit outside of the vehicle, that is, the recognition system 200, is selected as a recognition unit that does not perform recognition of a target. In this rule, the selection unit 156 may select only the in-vehicle recognition units 152 as recognition units that perform recognition of a target.

Regarding the failure of a sensor 2, there are two entries (code: 02-020, 02-021) in the rule, and the number of recognition units 152 selected as recognition units that do not perform recognition of a target varies according to an abnormality level. For example, it is assumed that the sensor 2 is a stereo camera formed of a pair of cameras that photograph an area in front of the vehicle. Also, it is assumed that a recognition unit 02, which is one of the recognition units 152, is able to obtain information representing the distance to an object in front of the vehicle on the basis of image data received from the pair of cameras. Also, it is assumed that a recognition unit 03 is able to obtain information representing the presence/absence and direction of the object in front of the vehicle on the basis of image data received from at least one of the pair of cameras. The failure in an abnormality level A of the sensor 2 (code: 02-020) is a failure of only one of the pair of cameras. In this case, the recognition unit 02, which is unable to obtain the data necessary for obtaining the distance, is selected as a recognition unit that does not perform recognition of a target. The failure in an abnormality level B of the sensor 2 (code: 02-021) is a failure of both the pair of cameras. In this case, the recognition unit 03 is also selected as a recognition unit that does not perform recognition of a target, in addition to the recognition unit 02.

If the battery charge is lower than a predetermined threshold (code: 03-010), for example, the recognition unit 152 that uses data output from a sensor with high power consumption is selected as a recognition unit that does not perform recognition of a target, or only a recognition unit given high priority from the viewpoint of safety is selected as a recognition unit that performs recognition of a target, so as to limit the recognition units that are operated.

Although not illustrated in FIG. 3, the recognition units that are operated are limited also when a sign of a decrease in performance, such as insufficient resources of the automated driving system 150, is detected.

The selection unit 156 outputs selection information representing the status (result) of selection that is actually being performed on the basis of the information output from the vehicle monitoring unit 155. The selection information is provided to the information presentation control apparatus 160.

The communication unit 157 transmits the data output from the detection unit 151 to the recognition system 200 outside of the vehicle, receives a recognition result from the recognition system 200, and transmits the recognition result to the situation judgment unit 153. Also, the communication unit 157 transmits the selection information output from the selection unit 156 to the information presentation control apparatus 160.

Figure 4:
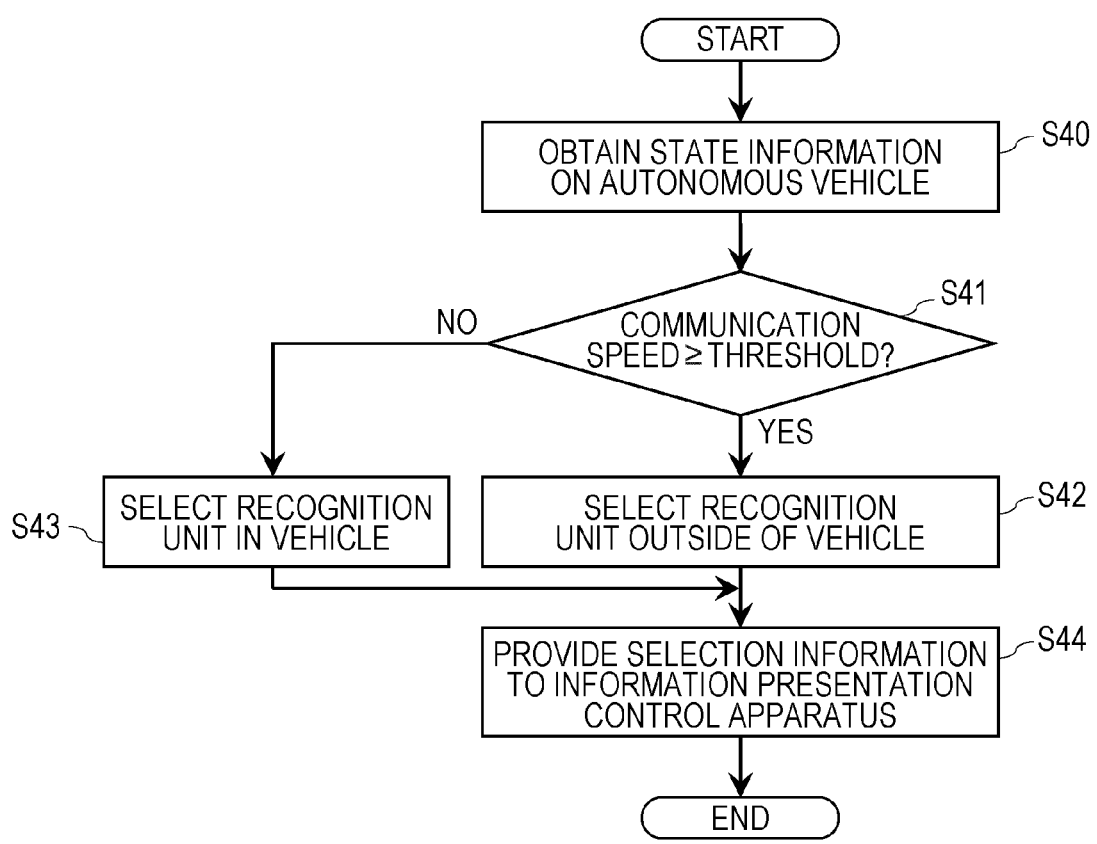
FIG. 4 is a flowchart illustrating an example of a procedure of a process including selection of a recognition unit and provision of selection information, performed in an automated driving system included in the autonomous vehicle.

FIG. 4 is a flowchart illustrating an example of a procedure of a process for selecting, from among the recognition units 152 and the recognition system 200, a recognition unit in accordance with the state of the autonomous vehicle 100 and providing selection information, performed in the automated driving system 150 having the above-described configuration. In this example, a recognition unit is selected in accordance with the speed of communication through the communication unit 157.

In the automated driving system 150, the vehicle monitoring unit 155 obtains state information representing the communication speed of the communication unit 157 (step S40).

On the basis of the state information, the selection unit 156 selects, from among the recognition units 152 and the recognition system 200, a recognition unit that performs recognition of a target or a recognition unit that does not perform recognition of a target. If the communication speed is higher than or equal to a predetermined threshold (YES In step S41), the selection unit 156 selects the recognition system 200, which is a recognition unit outside of the vehicle, as a recognition unit that performs recognition of a target (step S42). If the communication speed is lower than the predetermined threshold (NO in step S41), the selection unit 156 selects at least one of the recognition units 152 in the vehicle as a recognition unit that performs recognition of a target (step S43).

Subsequently, the selection unit 156 outputs selection information representing the status of selection that has actually been performed in the foregoing procedure, so as to provide the selection information to the information presentation control apparatus 160 (step S44). The selection information output here may be transmitted to the information presentation control apparatus 160 or may be written in the storage unit 180 and stored as part of the various pieces of data.

In step S43, the selection unit 156 may perform selection of the recognition unit outside of the vehicle as a recognition unit that does not perform recognition of a target, instead of or in addition to the foregoing selection.

The above-described components of the automated driving system 150 are implemented when the ECU of the automated driving system 150 reads a program from the storage unit 180 and executes the program, and as necessary, obtains data from a sensor, transmits/receives data through a communication module, or refers to the various pieces of data stored in the storage unit 180.

The information presentation control apparatus 160 includes a selection information obtaining unit 161 and a presentation control unit 166, and is an example of an information presentation control apparatus according to this embodiment.

The selection information obtaining unit 161 obtains selection information representing a selection status of a plurality of recognition units that recognize different targets in the surroundings of the autonomous vehicle 100. The plurality of recognition units includes the recognition units 152 and the recognition system 200. In this embodiment, the selection information obtaining unit 161 receives and obtains a result of selection of a recognition unit from among a plurality of recognition units actually performed by the selection unit 156, the result being transmitted from the automated driving system 150, more specifically, selection information representing a status of selection of at least one of a recognition unit that performs recognition of a target and a recognition unit that does not perform recognition of a target.

In accordance with the selection information obtained by the selection information obtaining unit 161, the presentation control unit 166 causes a presentation device to present driving information, which is information about at least one of driving by the automated driving system 150 of the autonomous vehicle 100 and driving by the driver.

Now, a more detailed description will be given of "driving information" and the presentation thereof.

The driving information is information for notifying the driver of the autonomous vehicle 100 of the details of driving to be performed by the driver. Here, the details of driving mean various driving actions including recognition, estimation, judgment, and operation. The driving information is information representing, when a certain target is not recognized in the automated driving system 150, recognition of the target, estimation or judgment based on the recognition, or an operation based on the estimation or judgment. The driving information is presented, to the driver, as a driving action that the automated driving system 150 does not perform or is not performing or as a driving action that is to be performed by the driver.

The driving information is presented as needed in response to a request from the driver of the autonomous vehicle 100, or when the control that is executable or is not executable by the automated driving system 150 is changed, by using at least one of a voice and an image through the presentation device. The image may be displayed in any manner as long as the image is visually recognizable by the driver. The driving information includes an indicator light near the driver's seat, or information that is presented by using either of a still image and a moving image displayed on the display device.

The driving information is obtained by the presentation control unit 166 in accordance with the selection information obtained by the selection information obtaining unit 161. For example, as illustrated in FIG. 5, data representing the information to be presented in accordance with the selection status of a recognition unit is stored in advance in the storage unit 180. The presentation control unit 166 refers to the data, obtains, on the basis of the selection information provided from the selection unit 156, information representing the details of driving that is to be performed or not to be performed by the automated driving system 150 or information representing the details of driving that is being performed now or not being performed now by the automated driving system 150, and presents the information as driving information to the driver.

For example, it is assumed that the presentation control unit 166 newly receives selection information representing the status where the recognition unit 01, which is one of the recognition units 152, is selected as a recognition unit that is performing recognition of a target. In this case, the presentation control unit 166 searches the column "recognition unit" for "recognition unit 01" and founds it in the second data row. Subsequently, the presentation control unit 166 refers to the second column from the left in the same row and obtains information indicating that automated steering for lane keep is possible. Subsequently, the presentation control unit 166 displays, on a display unit, a message generated by substituting the information for a variable portion of a predetermined template massage, or outputs a voice message from a speaker, so as to present the driving information to the driver.

Another example of the manner of presenting driving information by the presentation control unit 166 will be described. In the table in FIG. 5, the column "information 1 presented when recognition is performed" shows the names of pieces of image data that are displayed on the display device when each recognition unit is selected as a recognition unit that is performing recognition of a target.

The column "information 2 presented when recognition is performed" shows the names of pieces of text data that are displayed on the display device when each recognition unit is selected.

The column "information 1 presented when recognition is not performed" shows the names of pieces of voice data that are output from the speaker when each recognition unit is selected as a recognition unit that does not perform recognition of a target.

These pieces of image data, text data, and voice data are pieces of data representing driving information and are stored in the storage unit 180. The presentation control unit 166 may obtain each piece of data on the basis of the selection information obtained by the selection information obtaining unit 161 by referring to the table in FIG. 5, and may cause the display device to display the details of the data as an image or text or may cause the speaker to output the data as a voice message, so as to present the data as driving information to the driver. As another example of presenting information, an indicator light to be turned on and the indication manner thereof (turn on, blink, color of light, and so forth) are designated for each selection status of each recognition unit in a table like the one illustrated in FIG. 5. The presentation control unit 166 operates an indicator light in accordance with the designation and thereby presents driving information.

Figure 6:
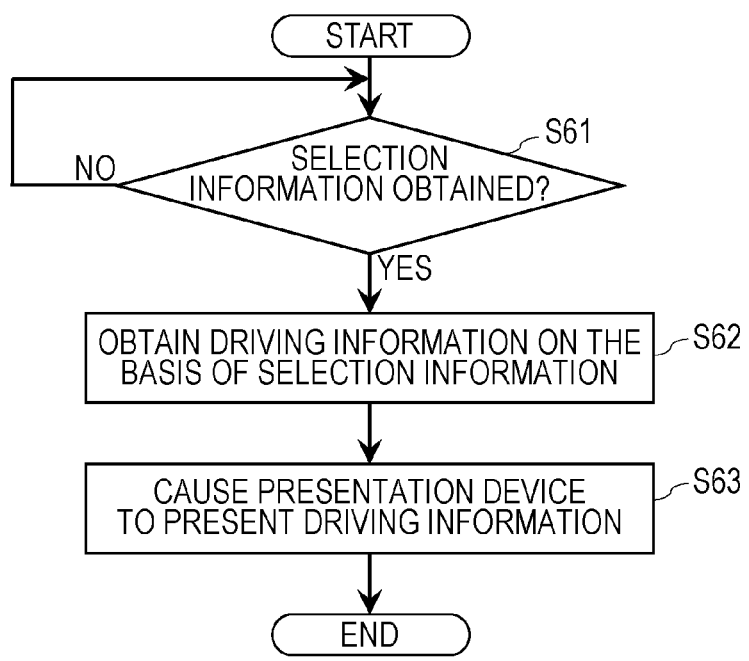
FIG. 6 is a flowchart illustrating an example of a procedure of a process from obtainment of selection information to presentation of driving information, performed in the information presentation control apparatus according to the embodiment.

FIG. 6 is a flowchart illustrating an example of a procedure of a process for obtaining selection information and presenting driving information, performed in the information presentation control apparatus 160 having the above-described configuration.

In the information presentation control apparatus 160, if the selection information obtaining unit 161 has obtained the selection information output from the automated driving system 150 (YES in step S61), the presentation control unit 166 obtains driving information on the basis of the selection information (step S62).

Subsequently, the presentation control unit 166 causes an appropriate presentation device to present the obtained driving information to the driver (step S63).

The selection information obtaining unit 161 and the presentation control unit 166 described above are components that are implemented when the ECU of the information presentation control apparatus 160 reads and executes a program and obtains necessary data from another component or refers to the data stored in the storage unit 180.

A description has been given of the operations of the automated driving system 150 and the information presentation control apparatus 160. Hereinafter, a description will be given of a specific example of a series of steps from selection of a recognition unit in the autonomous vehicle 100 including the automated driving system 150 and the information presentation control apparatus 160 to presentation of driving information.

For example, in the automated driving system 150, if it is judged on the basis of the state information obtained through monitoring by the vehicle monitoring unit 155 (step S40 in FIG. 4) that the communication speed of the communication unit 157 is lower than the predetermined threshold (NO in step S41 in FIG. 4), the selection unit 156 selects at least one of the recognition units 152 in the vehicle as a recognition unit that performs recognition of a target, in response to the judgment result (step S43 in FIG. 4).

In this case, it is assumed that the recognition unit 01 is selected as an in-vehicle recognition unit that performs recognition of a target. The recognition unit 01 recognizes the position in the lateral direction in the lane on the basis of the image data obtained from the detection unit 151 and provides information representing the recognition result to the situation judgment unit 153. The situation judgment unit 153 judges, on the basis of the information, whether the position in the lateral direction in the lane is appropriate. If the position is inappropriate, the situation judgment unit 153 causes the driving control unit 154 to perform a steering operation for moving the vehicle to an appropriate position in the lateral direction.

The selection information representing the status of selection of a recognition unit is output from the selection unit 156 and is provided to the information presentation control apparatus 160 (step S44 in FIG. 4).

Figure 7:
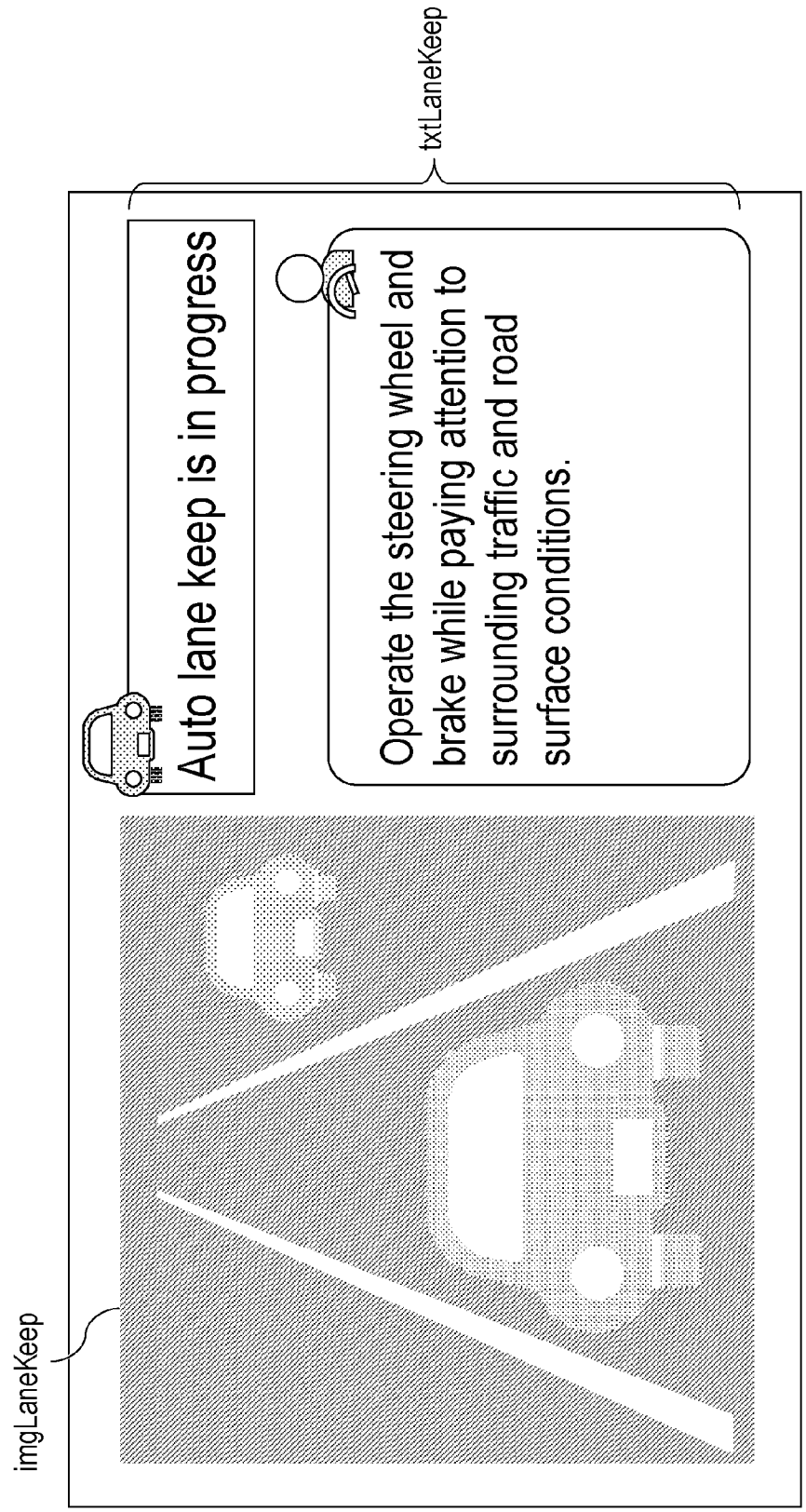
FIG. 7 illustrates an example of driving information presented to a driver by a presentation device in the embodiment.

If the selection information obtaining unit 161 has obtained the selection information (step S61 in FIG. 6), the presentation control unit 166 obtains data of driving information with reference to the table in FIG. 5 on the basis of the selection information (step S62). In the foregoing assumption, the data obtained with reference to the table in FIG. 5 is the image data "imgLaneKeep" and the text data "txtLaneKeep". FIG. 7 illustrates an example of these pieces of data presented on the display device of the presentation device by the presentation control unit 166 (step S63).

In this example, the image displayed on the left half of the screen corresponds to the image data "imgLaneKeep" in the table in FIG. 5, whereas the message displayed on the right half of the screen corresponds to the text data "txtLaneKeep".

On the display device, lane keep that is being performed by the automated driving system 150 when the recognition unit 01 is selected is shown by using the image data "imgLaneKeep". The lane keep is driving including recognition, judgment or estimation, and an operation of the steering system.

Also, lane keep that is being performed by the automated driving system 150 when the recognition unit 01 is selected is shown in the upper right portion of the screen by using the text data "txtLaneKeep". Furthermore, information about the driving to be performed by the driver is shown in the lower right portion of the screen. The information about the driving to be performed by the driver represents the details of driving that the automated driving system 150 does not perform or is not performing. With this display, the driver is able to know the driving action to be performed by himself/herself.

Alternatively, the text may be read out automatically or in response to a request from the driver so that the driver does not need to gaze at the screen of the display device.

As another example, it is assumed that, if it is judged that the speed of communication performed by the communication unit 157 is lower than the predetermined threshold (NO in step S41 in FIG. 4), the selection unit 156 selects the recognition unit 03 as an in-vehicle recognition unit that performs recognition of a target among the in-vehicle recognition units 152 (step S43 in FIG. 4).

The recognition unit 03 recognizes the position of the autonomous vehicle 100 on the road surface on the basis of the data obtained from the detection unit 151 and provides information representing the recognition result to the situation judgment unit 153. On the basis of the information, the situation judgment unit 153 judges whether or not the position on the road surface is appropriate. If the position is inappropriate, the situation judgment unit 153 causes the driving control unit 154 to perform a necessary operation among a steering operation, an acceleration operation, and a braking operation to move the vehicle to an appropriate position.

The selection information representing such a selection status of a recognition unit is output from the selection unit 156 and is provided to the information presentation control apparatus 160 (step S44 in FIG. 4).

Figure 8:
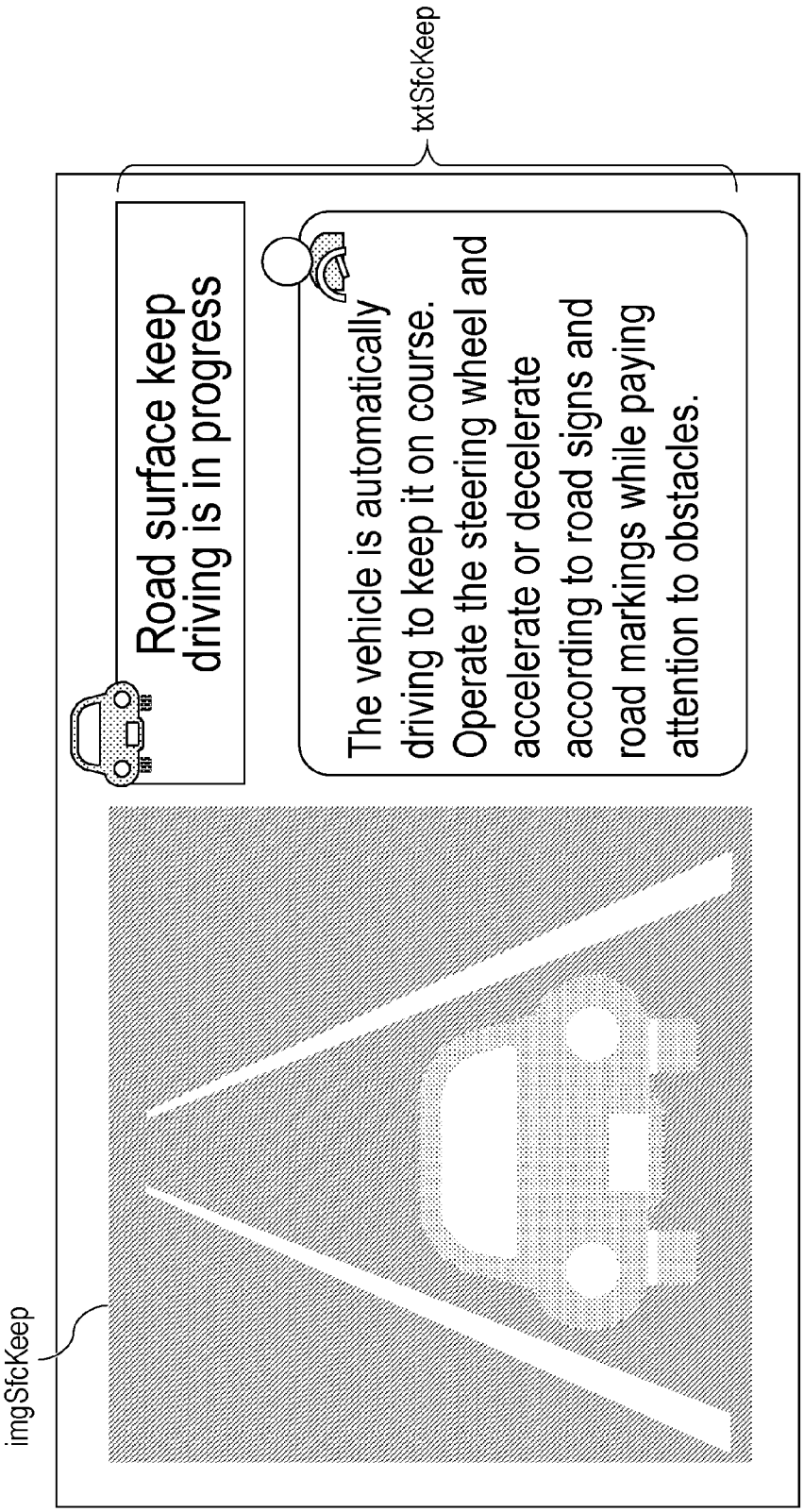
FIG. 8 illustrates another example of driving information presented to the driver by the presentation device in the embodiment.

If the selection information obtaining unit 161 has obtained the selection information (step S61 in FIG. 6), the presentation control unit 166 obtains data of driving information with reference to the table in FIG. 5 on the basis of the selection information (step S62). In the foregoing assumption, the data obtained with reference to the table in FIG. 5 is the image data "imgSfcKeep" and the text data "txtSfcKeep". FIG. 8 illustrates an example of these pieces of data presented on the display device of the presentation device by the presentation control unit 166 (step S63).

In this example, the image displayed on the left half of the screen corresponds to the image data "imgSfcKeep" in the table in FIG. 5, whereas the message displayed on the right half of the screen corresponds to the text data "txtSfcKeep".

On the display device, road surface keep driving that is being performed by the automated driving system 150 when the recognition unit 03 is selected is shown by using the image data "imgSfcKeep". The road surface keep driving is driving including recognition, judgment or estimation, and an operation of the driving system, the braking system, and the steering system.

Also, road surface keep driving that is being performed by the automated driving system 150 when the recognition unit 03 is selected is shown in the upper right portion of the screen by using the text data "txtSfcKeep". Furthermore, information about the driving to be performed by the driver is shown in the lower right portion of the screen. With this display, the driver is able to know the driving action to be performed by himself/herself. The information about the driving to be performed by the driver represents the details of driving that the automated driving system 150 does not perform or is not performing.

As another example, it is assumed that, if it is judged that the speed of communication performed by the communication unit 157 is higher than or equal to the predetermined threshold (YES in step S41 in FIG. 4), the selection unit 156 selects a recognition unit outside of the vehicle (the recognition system 200) as a recognition unit that performs recognition of a target (step S42 in FIG. 4).

The recognition system 200 predicts the occurrence of rush of a person or a passing body in front of the vehicle on the basis of the data obtained from the detection unit 151 and provides information representing the prediction result to the situation judgment unit 153. On the basis of the information, the situation judgment unit 153 causes the driving control unit 154 to perform a braking operation for deceleration and a steering operation for avoiding collision.

The selection information representing such a selection status of a recognition unit is output from the selection unit 156 and is provided to the information presentation control apparatus 160 (step S44 in FIG. 4).

Figure 9:
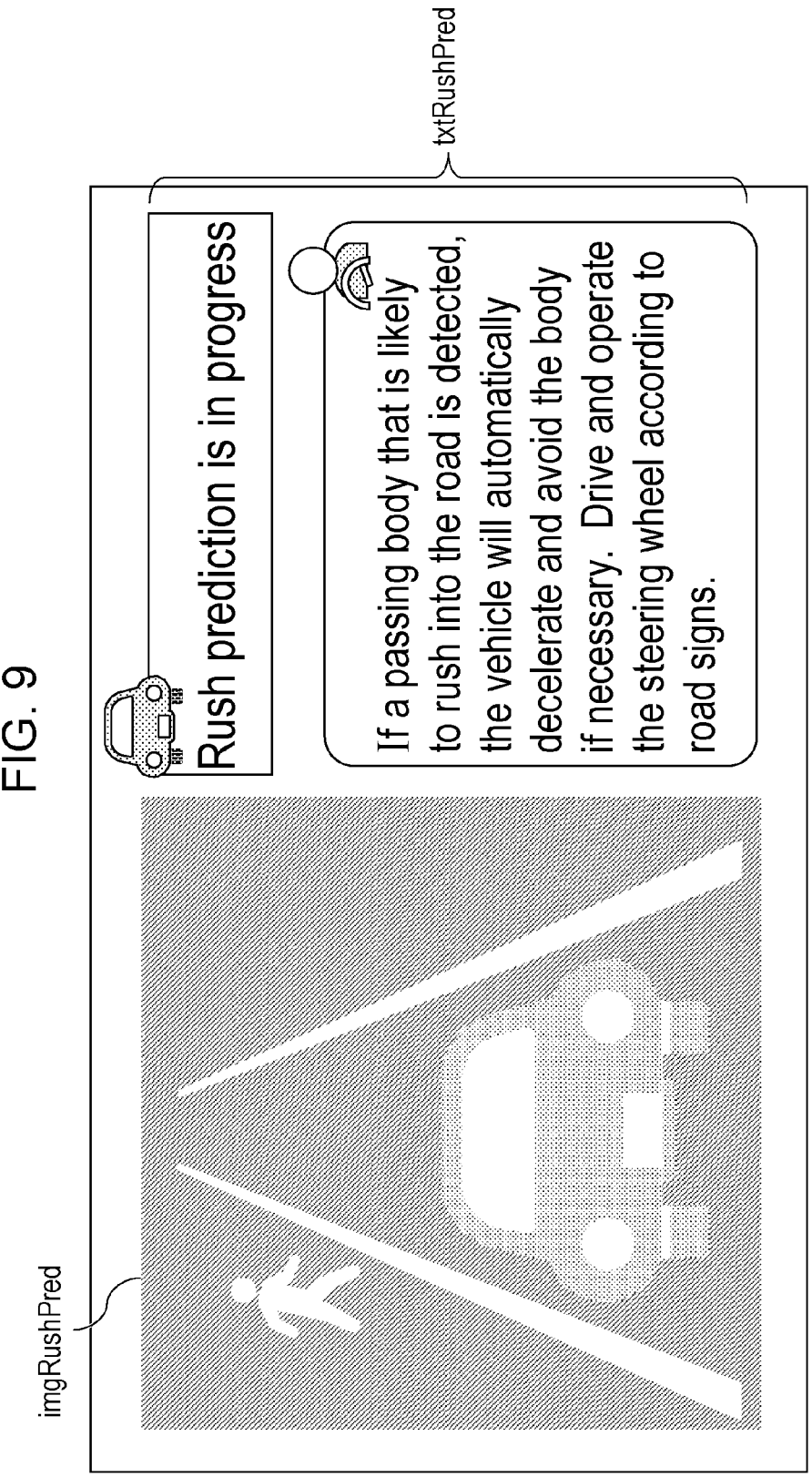
FIG. 9 illustrates another example of driving information presented to the driver by the presentation device in the embodiment.

If the selection information obtaining unit 161 has obtained the selection information (step S61 in FIG. 6), the presentation control unit 166 obtains data of driving information with reference to the table in FIG. 5 on the basis of the selection information (step S62). In the foregoing assumption, the data obtained with reference to the table in FIG. 5 is the image data "imgRushPred" and the text data "txtRushPred". FIG. 9 illustrates an example of these pieces of data presented on the display device of the presentation device by the presentation control unit 166 (step S63).

In this example, the image displayed on the left half of the screen corresponds to the image data "imgRushPred" in the table in FIG. 5, whereas the message displayed on the right half of the screen corresponds to the text data "txtRushPred".

On the display device, rush prediction that is being performed by the automated driving system 150 when the recognition system 200 is selected is shown by using the image data "imgRushPred". The rush prediction is driving including recognition, judgment or estimation, and an operation of the braking system and the steering system.

Also, rush prediction that is being performed by the automated driving system 150 when the recognition system 200 is selected is shown in the upper right portion of the screen by using the text data "txtRushPred". Furthermore, information about the driving to be performed by the driver is shown in the lower right portion of the screen. With this display, the driver is able to know the driving action to be performed by himself/herself. The information about the driving to be performed by the driver represents the details of driving that the automated driving system 150 is not performing.

As described above, the information presentation control apparatus 160 according to this embodiment includes the selection information obtaining unit 161 and the presentation control unit 166.

The selection information obtaining unit 161 obtains selection information representing a selection status of a plurality of recognition units that recognize different targets in surroundings of the autonomous vehicle 100. The foregoing plurality of recognition units include the recognition units 152 and the recognition system 200.

The presentation control unit 166 causes the presentation device mounted in the autonomous vehicle 100 to present driving information in accordance with the selection information. The driving information is based on at least one of control that is executable by the autonomous vehicle 100 and control that is not executable by the autonomous vehicle 100 and is information about at least one of driving by the automated driving system 150 of the autonomous vehicle 100 and driving by the driver.

Accordingly, information (driving information) about driving by the automated driving system 150 or the driving action to be performed by the driver, the information changing according to the in-vehicle situation of the autonomous vehicle 100, can be provided to the driver.

For example, the selection status of the plurality of recognition units is a status of selection of a recognition unit that performs recognition of a target or a recognition unit that does not perform recognition of a target from among the plurality of recognition units.

Accordingly, the information presentation control apparatus 160 is able to provide driving information to the driver on the basis of information representing a target that is recognized in the automated driving system 150 or a target that is not recognized in the automated driving system 150.

For example, the selection information obtaining unit 161 obtains, from the automated driving system 150, the selection information representing a result of selection of a recognition unit from among the plurality of recognition units.

Accordingly, the information presentation control apparatus 160 is able to provide driving information to the driver on the basis of an actual selection status of a recognition unit in the automated driving system 150.

Note that the manner in which the selection information is presented and obtained is not limited to that described above.

For example, the selection information obtaining unit 161 may obtain selection judgment criterion information that is to be used for judgment for selection in the automated driving system 150 and may obtain the selection information by estimating the selection status on the basis of the selection judgment criterion information.

Here, the selection judgment criterion information is information used for judgment for selecting a recognition unit, and is, for example, information provided from the vehicle monitoring unit 155. The selection information obtaining unit 161 processes the selection judgment criterion information in accordance with the same algorithm as that used by the selection unit 156. Accordingly, the selection information obtaining unit 161 obtains selection information representing a section status by estimating the recognition unit selected by the selection unit 156.

For example, the selection information obtaining unit 161 may obtain information representing an operation status of the detection unit 151 or the communication unit 157 included in the autonomous vehicle 100, the information being for obtaining information used for recognizing a target, and may obtain the selection information by judging, on the basis of the information representing the operation status, a recognition unit to be selected.

Here, the information representing an operation status is control information on the CAN obtained by the vehicle monitoring unit 155, for example. On the basis of the information, the selection information obtaining unit 161 judges a recognition unit that is not able to perform recognition of a target.

In this way, the information presentation control apparatus 160 is able to obtain selection information without waiting for selection of a recognition unit by the selection unit 156 in the automated driving system 150, and accordingly driving information can be quickly provided to the driver.

The information representing the operation status may include information representing an abnormality of a sensor included in the detection unit 151, and the recognition unit that does not perform recognition of a target may include a recognition unit that uses a detection result output from the sensor having the abnormality to recognize a target.

The information representing the operation status may include information representing communication quality of the communication unit 157 or whether or not the communication unit 157 is performing communication, and the recognition unit that does not perform recognition of a target may include a recognition unit configured to use information communicated by the communication unit 157 to recognize a target in a situation where the communication quality of the communication unit 157 is lower than predetermined quality or a situation where the communication unit 157 is not performing communication.

Accordingly, the information presentation control apparatus 160 is able to provide the driver with driving information reflecting a selection status of a recognition unit that is selected in accordance with whether or not information necessary to recognize a target has been obtained or whether or not data of a recognition result has been transmitted.

The presentation device presents driving information to the driver by using at least one of a sound and an image.

Accordingly, the information presentation control apparatus 160 is able to present driving information to the driver who is driving as needed, by using a sound, visual information such as a moving image, a still image, or an indicator light, or a combination thereof.

The driving information is information including details of driving that the automated driving system 150 does not perform.

Such information represents a driving action that the automated driving system 150 is not performing and that is to be performed by the driver. With the information being presented, the driver is able to know the driving action to be performed by himself/herself.

Modification Example of Embodiment

An information presentation control apparatus according to a modification example of the embodiment is, like the information presentation control apparatus 160, mounted in an autonomous vehicle including an automated driving system. Hereinafter, a description will be given mainly of the difference from the above-described embodiment. The same components are denoted by the same reference numerals and the description thereof is omitted.

Figure 10:
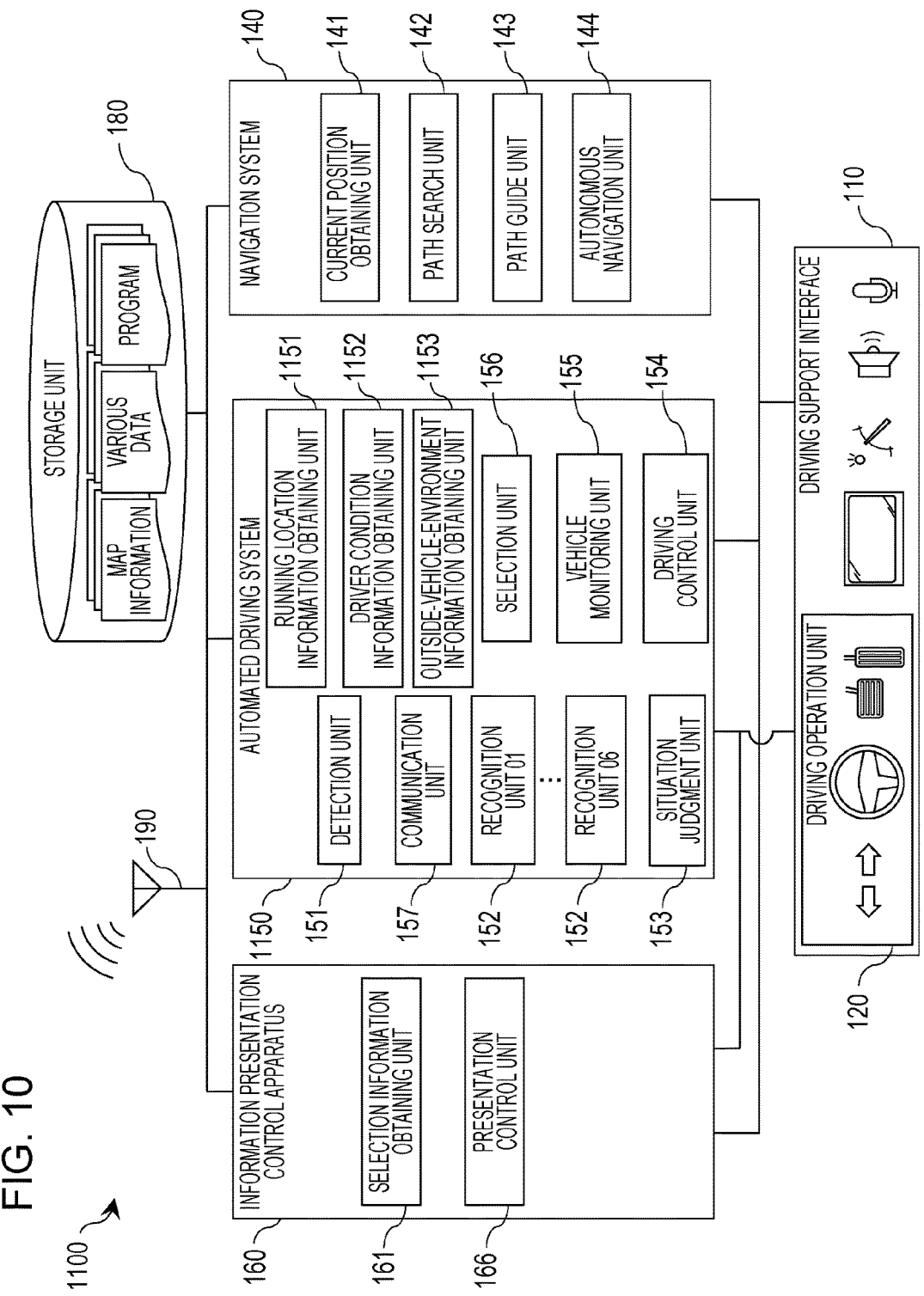
FIG. 10 is a functional block diagram illustrating the functional configuration of an autonomous vehicle including an information presentation control apparatus according to a modification example of the embodiment.

FIG. 10 is a functional block diagram illustrating the functional configuration of an autonomous vehicle 1100.

In an automated driving system 1150 included in the autonomous vehicle 1100 according to this modification example, other information is usable to select a recognition unit, in addition to the information used in the embodiment.

The automated driving system 1150 includes, in addition to the components according to the embodiment, a running location information obtaining unit 1151, a driver condition information obtaining unit 1152, and an outside-vehicle-environment information obtaining unit 1153.

The running location information obtaining unit 1151 obtains running location information representing a characteristic of a location where the autonomous vehicle 1100 is running, on the basis of the map information stored in the storage unit 180. The "characteristic of a location where the autonomous vehicle 1100 is running" is also referred to as a running location of the autonomous vehicle 1100.

Here, the "characteristic of the location where the vehicle is running" is the type of road, such as a general road or an expressway; the shape of road, such as a straight road or a winding road; the type of area, such as an urban area, city streets, or a mountainous area; and a special situation such as inside or outside a tunnel. Information representing the location where the autonomous vehicle 1100 is running, that is, the current position, is provided from the current position obtaining unit 141 of the navigation system 140, for example. The running location information obtained by the running location information obtaining unit 1151 is output to the selection unit 156.

The driver condition information obtaining unit 1152 monitors the driver in the driver's seat of the autonomous vehicle 1100 and obtains driver condition information representing the physical condition of the driver.

Here, the "physical condition of the driver" is a condition that may have an influence on the performance of safe driving, such as a fatigue level, a concentration level, an arousal level, or change in health of the driver. The driver condition information may be obtained by the driver condition information obtaining unit 1152 by analyzing the data output from various types of sensors (not illustrated) that are included in the driver condition information obtaining unit 1152 and that photograph the driver or measure biological data of the driver or the data of CAN information representing the driving status of the autonomous vehicle 1100 (for example, a continuous driving time or the status of operation of the driving operation unit 120 by the driver). The driver condition information obtained by the driver condition information obtaining unit 1152 is output to the selection unit 156.

The outside-vehicle-environment information obtaining unit 1153 obtains outside-vehicle-environment information representing the environment outside of the autonomous vehicle 1100.

Here, the "environment outside of the vehicle" is the environment outside of the autonomous vehicle 1100 in the location where the autonomous vehicle 1100 is running, such as the weather or lightness, or a factor that indirectly represents the weather or lightness (for example, temperature, time, visibility, or road surface condition). The outside-vehicle-environment information may be detected by a sensor (not illustrated) included in the outside-vehicle-environment information obtaining unit 1153, or may be obtained by the outside-vehicle-environment information obtaining unit 1153 that has obtained the data output from each sensor included in the detection unit 151 of the automated driving system 1150 by analyzing the data. Alternatively, information that is obtainable from the outside of the automated driving system 1150 through the communication unit 157 (for example, weather information or traffic information about individual areas distributed through the Internet) may be obtained as outside-vehicle-environment information. The outside-vehicle-environment information obtained by the outside-vehicle-environment information obtaining unit 1153 is output to the selection unit 156.

The running location information obtaining unit 1151, the driver condition information obtaining unit 1152, and the outside-vehicle-environment information obtaining unit 1153 described above are components that are implemented when the ECU of the automated driving system 1150 reads and executes a program and obtains data from a sensor or refers to the data stored in the storage unit 180 as necessary.

On the other hand, the selection unit 156 may select a recognition unit further in accordance with, in addition to an abnormality detected by the vehicle monitoring unit 155, a characteristic represented by the running location information received from the running location information obtaining unit 1151. Also, the selection unit 156 may select a recognition unit further in accordance with the physical condition of the driver represented by the driver condition information received from the driver condition information obtaining unit 1152.

Alternatively, the selection unit 156 may select a recognition unit in accordance with the environment outside of the vehicle represented by the outside-vehicle-environment information received from the outside-vehicle-environment information obtaining unit 1153. Hereinafter, a description will be given of selection of a recognition unit performed in accordance with these pieces of information, by using specific examples.

Figure 11A:
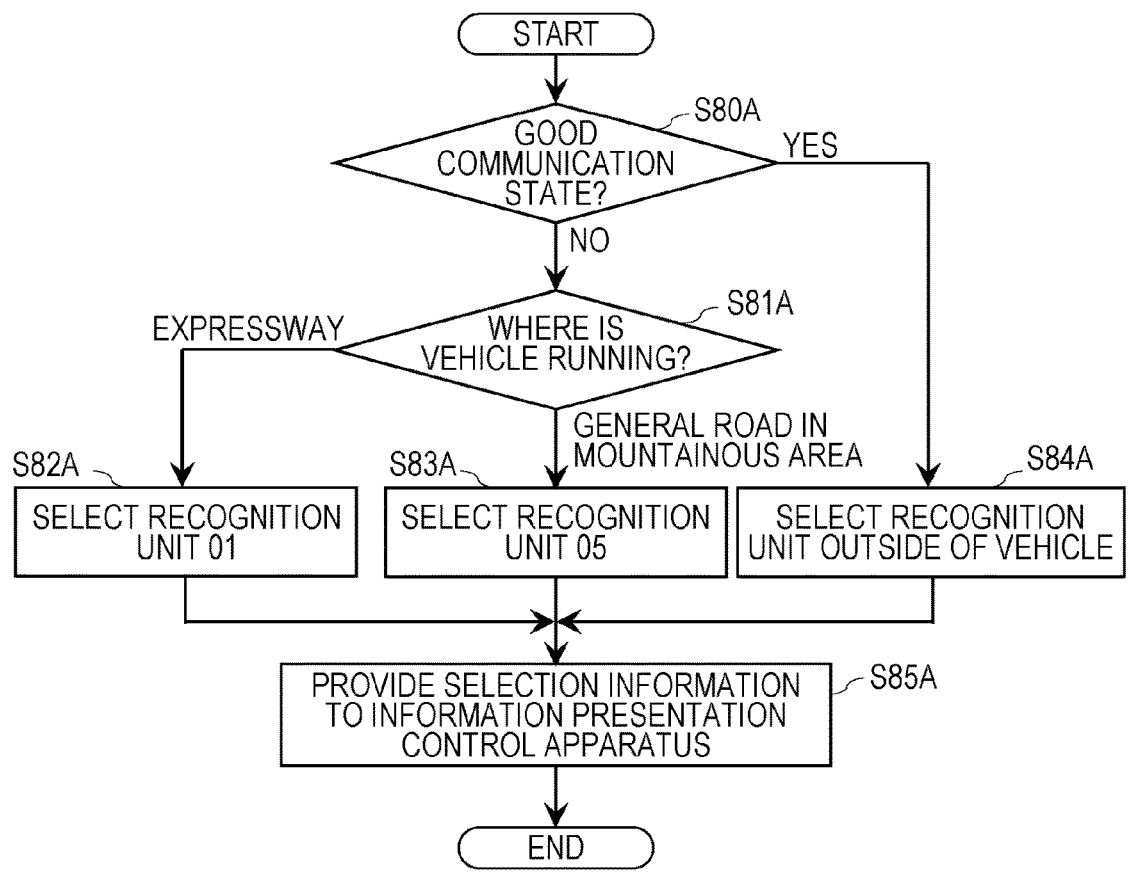
FIG. 11A is a flowchart illustrating an example of an operation of a selection unit according to the modification example of the embodiment.

FIG. 11A is a flowchart illustrating an example of the operation of the selection unit 156 in the automated driving system 1150 having the above-described configuration. In this example, the selection unit 156 uses the running location information output from the running location information obtaining unit 1151 in addition to the information about the communication state monitored by the vehicle monitoring unit 155.

The selection unit 156 evaluates the communication state on the basis of the information provided from the vehicle monitoring unit 155 (step S80A). Specifically, for example, the selection unit 156 evaluates that the communication state is good if the communication speed is higher than or equal to the predetermined threshold.

If the communication state is good (YES in step S80A), the selection unit 156 selects the recognition system 200, which is a recognition unit outside of the vehicle, as a recognition unit that performs recognition of a target (step S84A).

If the communication state is not good (NO in step S80A), the selection unit 156 obtains running location information from the running location information obtaining unit 1151. The selection unit 156 identifies the running location of the autonomous vehicle 1100 indicated by the running location information.

If the running location of the autonomous vehicle 1100 is an expressway ("expressway" in step S81A), the selection unit 156 selects the recognition unit 01, which is one of the in-vehicle recognition units 152, as a recognition unit that performs recognition of a target (step S82A). The selected recognition unit 01 is a recognition unit that recognizes a white line or the like representing a lane on a road.

If the running location of the autonomous vehicle 1100 is a general road in a mountainous area ("general road in mountainous area" in step S81A), the selection unit 156 selects the recognition unit 05, which is one of the in-vehicle recognition units 152 and is different from the recognition unit 01, as a recognition unit that performs recognition of a target (step S83A). The selected recognition unit 05 is a recognition unit that recognizes, for example, an obstacle that blocks traffic, such as an animal or stone.

Also, for example, a first rule and a second rule may be stored in the storage unit 180. The first rule is, for example, information indicating that a recognition unit to be selected by the selection unit 156 is a recognition unit 01 in a case that a communication state is not good and that a running location of the autonomous vehicle 1100 is an expressway. The second rule is, for example, information indicating that a recognition unit to be selected by the selection unit 156 is a recognition unit 05 in a case that a communication state is not good and that a running location of the autonomous vehicle 1100 is a general road in a mountainous area.

For example, in step 81A, if the running location of the autonomous vehicle 1100 is an expressway, the selection unit 156 may obtain, from the storage unit 180, the first rule as a rule corresponding to the case that the communication state is not good and that the running location of the autonomous vehicle 1100 is an expressway. In step 82A, the selection unit 156 may select the recognition unit 01 in accordance with the first rule.

For example, in step 81A, if the running location of the autonomous vehicle 1100 is a general road in a mountainous area, the selection unit 156 may obtain, from the storage unit 180, the second rule as a rule corresponding to the case that the communication state is not good and that the running location of the autonomous vehicle 1100 is a general road in a mountainous area. In step 83A, the selection unit 156 may select the recognition unit 05 in accordance with the second rule.

After the recognition unit has been selected by the selection unit 156 in the above-described manner in accordance with a predetermined algorithm, the selection information is provided to the information presentation control apparatus 160 (step S85A). In the information presentation control apparatus 160, the presentation control unit 166 obtains driving information corresponding to the selection information and presents the driving information to the driver. For example, if the recognition unit 01 is selected, the driving information illustrated in FIG. 7 is presented on the display device.

Figure 11B:
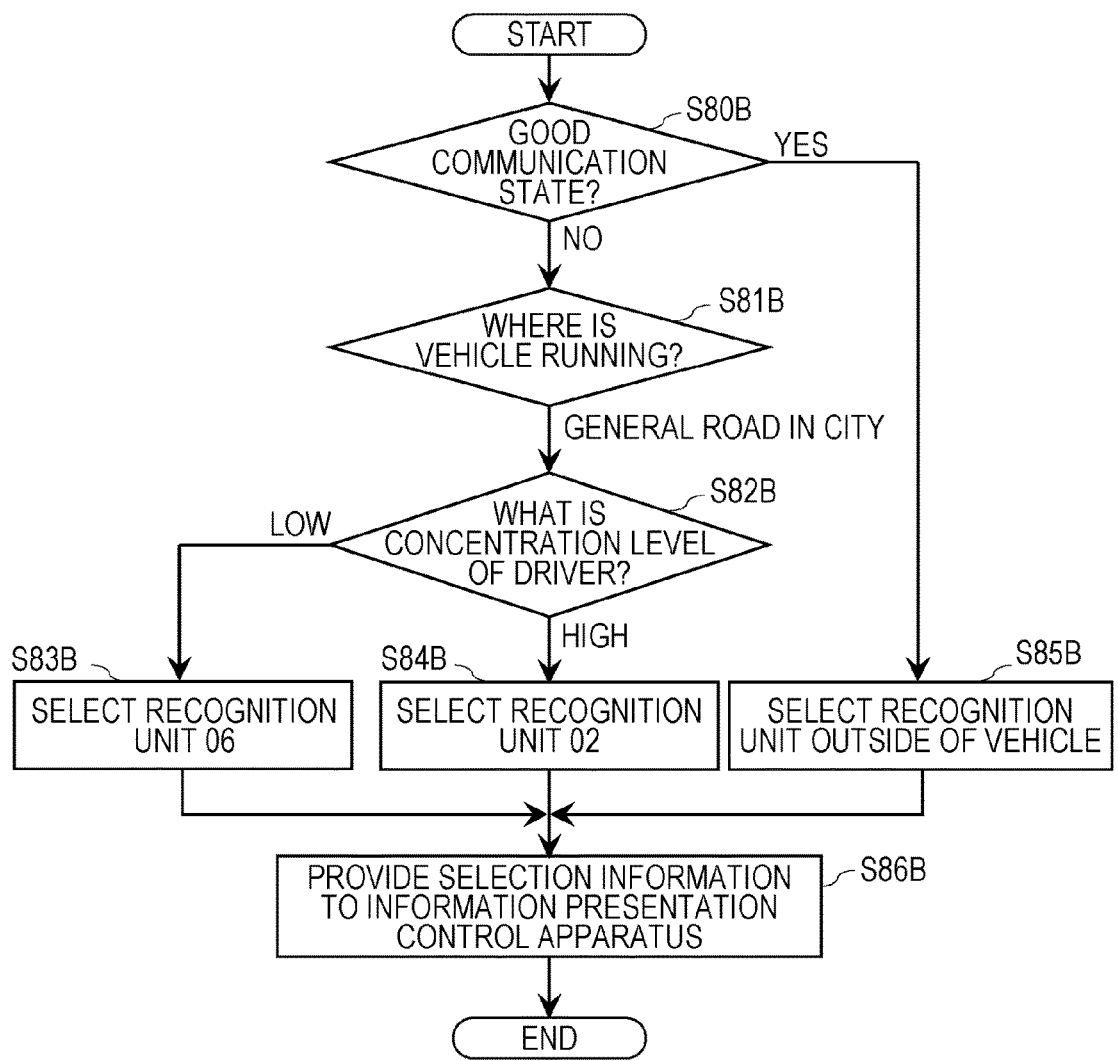
FIG. 11B is a flowchart illustrating an example of an operation of the selection unit according to the modification example of the embodiment.

FIG. 11B is a flowchart illustrating another example of the operation of the selection unit 156. In this example, the driver condition information output from the driver condition information obtaining unit 1152 is further used. The selection unit 156 evaluates the communication state on the basis of the information provided from the vehicle monitoring unit 155 (step S80B).

If the communication state is good (YES in step S80B), the selection unit 156 selects the recognition system 200, which is a recognition unit outside of the vehicle, as a recognition unit that performs recognition of a target (step S85B).

If the communication state is not good (NO in step S80B), the selection unit 156 obtains running location information from the running location information obtaining unit 1151. For example, the selection unit 156 identifies a running location of the autonomous vehicle 1100 indicated by the running location information.

If the running location of the autonomous vehicle 1100 is a general road in a city ("general road in city" in step S81B), the selection unit 156 obtains driver condition information from the driver condition information obtaining unit 1152. The selection unit 156 identifies a physical condition of the driver indicated by the driver condition information. The physical condition of the driver is information indicating a concentration level of the driver in this example. For example, the concentration level of the driver is a level that the driver watches carefully around the autonomous vehicle 1100.

Note that, in step 81B, if the running location is not a general road in a city, the above-described step S81A may be performed. Also, step S82A or step S83A may be performed based on the running location of the autonomous vehicle 1100. Also, step S85A may be performed after step S82A or step S83A. The descriptions of step S81A, step S82A, step S83A, and step S85A are omitted in this example.

If the driver condition information indicates that the concentration level of the driver is lower than a predetermined level ("low" in step S82B), the selection unit 156 determines that the driver is not watching carefully around the autonomous vehicle 1100. In this case, the selection unit 156 selects the recognition unit 06, which is one of the in-vehicle recognition units 152 (step S83B). The selected recognition unit 06 is a recognition unit that recognizes a person, such as a passerby.

If the driver condition information indicates that the concentration level of the driver is equal to or higher than the predetermined level ("high" in step S82B), the selection unit 156 determines that the driver is watching carefully around the autonomous vehicle 1100. In this case, the selection unit 156 selects the recognition unit 02, which is one of the in-vehicle recognition units 152 and is different from the recognition unit 06 (step S84B). The selected recognition unit 02 is a recognition unit that recognizes, for example, the distance to a vehicle running ahead in the same lane (inter-vehicle distance).

Also, for example, a third rule and a fourth rule may be stored in the storage unit 180. The third rule is, for example, information indicating that a recognition unit to be selected by the selection unit 156 is the recognition unit 06 in a case that a communication state is not good, that a running location of the autonomous vehicle 1100 is a general road in a city, and that a concentration level of the driver is lower than a predetermined level. The fourth rule is, for example, information indicating that a recognition unit to be selected by the selection unit 156 is the recognition unit 02 in a case that a communication state is not good, that a running location of the autonomous vehicle 1100 is a general road in a city, and that a concentration level of the driver is equal to or higher than the predetermined level.

For example, in step 82B, if the driver condition information indicates that the concentration level of the driver is lower than the predetermined level, the selection unit 156 may obtain, from the storage unit 180, the third rule as a rule corresponding to the case that the communication state is not good, that the running location of the autonomous vehicle 1100 is a general road in a city, and that the concentration level of the driver is lower than the predetermined level. In step 83B, the selection unit 156 may select the recognition unit 06 in accordance with the third rule.

For example, in step 82B, if the driver condition information indicates that the concentration level of the driver is equal to or higher than the predetermined level, the selection unit 156 may obtain, from the storage unit 180, the fourth rule as a rule corresponding to the case that the communication state is not good, that the running location of the autonomous vehicle 1100 is a general road in a city, and that the concentration level of the driver is equal to or higher than the predetermined level. In step 84B, the selection unit 156 may select the recognition unit 02 in accordance with the fourth rule.

Figure 12:
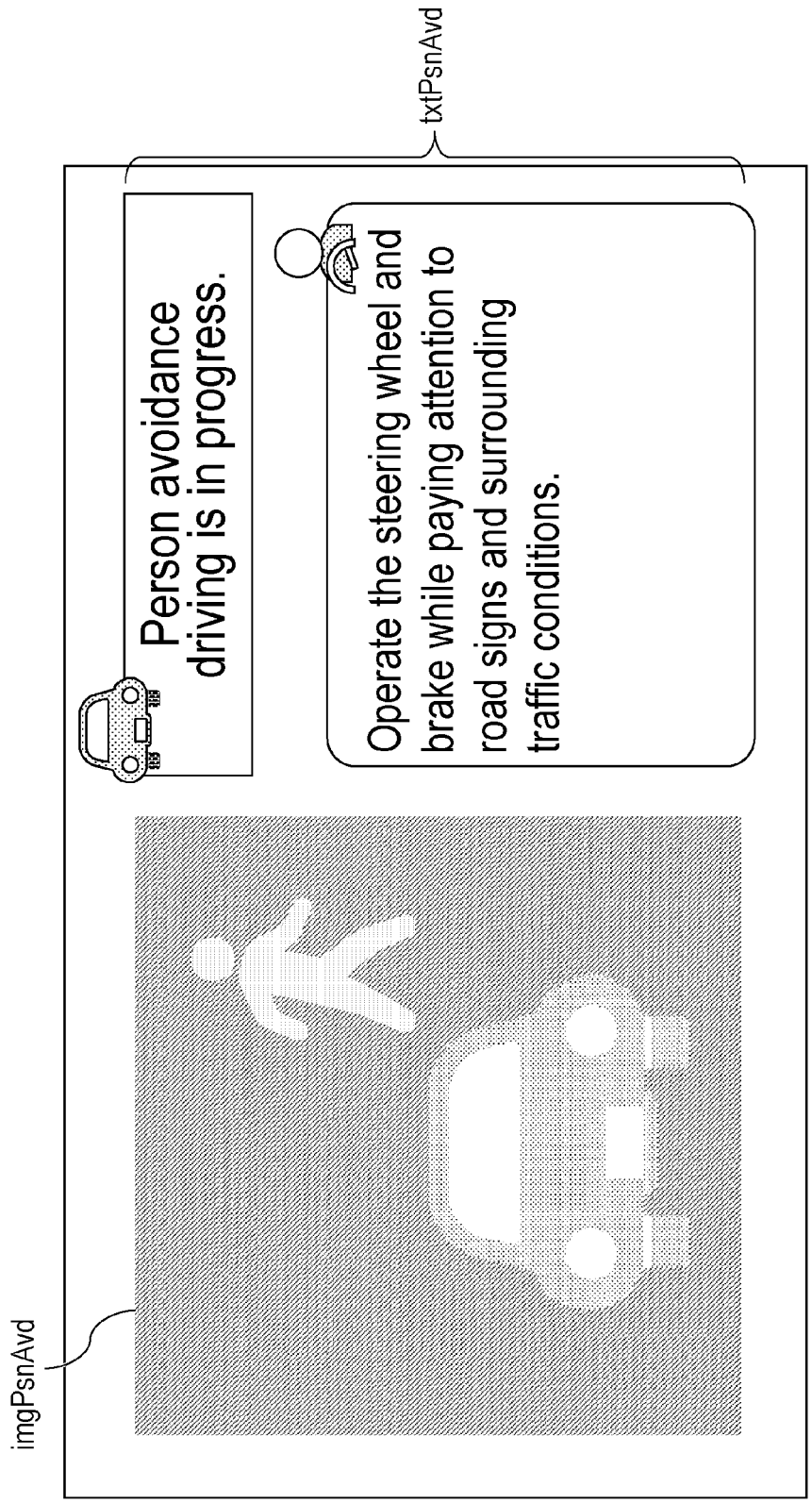
FIG. 12 illustrates an example of driving information presented to a driver by a presentation device in the modification example of the embodiment.

After the recognition unit has been selected by the selection unit 156 in the above-described manner in accordance with the predetermined algorithm, the selection information is provided to the information presentation control apparatus 160 (step S86B). In the information presentation control apparatus 160, the presentation control unit 166 obtains driving information corresponding to the selection information and presents the driving information to the driver. For example, if the recognition unit 06 is selected, the driving information illustrated in FIG. 12 is presented on the display device. In this example, the image displayed on the left half of the screen is shown as the image data "imgPsnAvd" in the table in FIG. 5 referred to by the presentation control unit 166, and the text message displayed on the right half of the screen is shown as the text data "txtPsnAvd". The image data "imgPsnAvd" represents person avoidance that is performed by the automated driving system 1150 when the recognition unit 06 is selected. The text data "txtPsnAvd" represents, in the frame on the upper side of the screen, the details of driving that is currently performed (the details of driving that can be performed) by the automated driving system 1150 when the recognition unit 06 is selected, and represents, in the frame on the lower side of the screen, the driving action that needs to be performed by the driver at this time (the details of driving that is not performed by the automated driving system 1150).

FIG. 11C is a flowchart illustrating another example of the operation of the selection unit 156. In this example, the outside-vehicle-environment information output from the outside-vehicle-environment information obtaining unit 1153 is further used.

The selection unit 156 evaluates the communication state on the basis of the information provided from the vehicle monitoring unit 155 (step S800).

If the communication state is good (YES in step S80C), the selection unit 156 selects the recognition system 200, which is a recognition unit outside of the vehicle, as a recognition unit that performs recognition of a target (step S86C).

If the communication state is not good (NO in step S80C), the selection unit 156 obtains running location information from the running location information obtaining unit 1151. For example, the selection unit 156 identifies a running location of the autonomous vehicle 1100 indicated by the running location information.

If the running location of the autonomous vehicle 1100 is a general road in a city ("general road in city" in step S810), the selection unit 156 obtains driver condition information from the driver condition information obtaining unit 1152. The selection unit 156 identifies a physical condition of the driver indicated by the driver condition information. The physical condition of the driver is information indicating a concentration level of the driver in this example. For example, the concentration level of the driver is a level that the driver watches carefully around the autonomous vehicle 1100.

Note that, in step S810, if the running location is not a general road in a city, step S81A may be performed. Also, step S82A or step S83A may be performed based on the running location of the autonomous vehicle 1100. Also, step S85A may be performed after step S82A or step S83A. The descriptions of step S81A, step S82A, step S83A and step S85A are omitted in this example.

If the driver condition information indicates that the concentration level of the driver is equal to or higher than a predetermined level ("high" in step S82C), the selection unit 156 obtains outside-vehicle-environment information from the outside-vehicle-environment information obtaining unit 1153. The selection unit 156 identifies environment outside of the autonomous vehicle 1100 indicated by the outside-vehicle-environment information. The environment outside of the autonomous vehicle 1100 is a lightness outside of the autonomous vehicle 1100, in this example.

Note that, in step 82C, if the driver condition information indicates that the concentration level of the driver is lower than the predetermined level, step S83B and step S86B may be performed. The descriptions of step S83B and step S86B are omitted in this example.

If the outside-vehicle-environment information indicates that the lightness outside of the autonomous vehicle 1100 is equal to or higher than a predetermined lightness ("light" in step S83C), the selection unit 156 determines that outside of the autonomous vehicle 1100 is light. In this case, the selection unit 156 selects the recognition unit 02, which is one of the in-vehicle recognition units 152 (step S84C). The selected recognition unit 02 is a recognition unit that recognizes, for example, the distance to a vehicle running ahead in the same lane (inter-vehicle distance).

If the lightness outside of the autonomous vehicle 1100 is lower than the predetermined lightness ("dark" in step S83C), the selection unit 156 determines that outside of the autonomous vehicle 1100 is dark. In this case, the selection unit 156 selects the recognition unit 04, which is one of the in-vehicle recognition units 152 and is different from the recognition unit 02 (step S85C). The selected recognition unit 04 is a recognition unit that recognizes, for example, the information written on a road sign.

Also, for example, a fifth rule and a sixth rule may be stored in the storage unit 180. The fifth rule is, for example, information indicating that a recognition unit to be selected by the selection unit 156 is the recognition unit 02 in a case that a communication state is not good, that a running location of the autonomous vehicle 1100 is a general road in a city, that a concentration level of the driver is equal to or higher than a predetermined level, and that the lightness outside of the autonomous vehicle 1100 is equal to or higher than a predetermined lightness. The sixth rule is, for example, information indicating that a recognition unit to be selected by the selection unit 156 is a recognition unit 04 in a case that a communication state is not good, that a running location of the autonomous vehicle 1100 is a general road in a city, that a concentration level of the driver is equal to or higher than a predetermined level, and that the lightness outside of the autonomous vehicle 1100 is lower than the predetermined lightness.

For example, in step 83C, if the outside-vehicle-environment information indicates that the lightness outside of the autonomous vehicle 1100 is equal to or higher than the predetermined lightness, the selection unit 156 may obtain, from the storage unit 180, the fifth rule as a rule corresponding to the case that the communication state is not good, that the running location of the autonomous vehicle 1100 is a general road in a city, that the concentration level of the driver is equal to or higher than the predetermined level, and that the lightness outside of the autonomous vehicle 1100 is equal to or higher than the predetermined lightness. In step S84C, the selection unit 156 may select the recognition unit 02 in accordance with the fifth rule.

For example, in step 83C, if the outside-vehicle-environment information indicates that the lightness outside of the autonomous vehicle 1100 is lower than the predetermined lightness, the selection unit 156 may obtain, from the storage unit 180, the sixth rule as a rule corresponding to the case that the communication state is not good, that the running location of the autonomous vehicle 1100 is a general road in a city, that the concentration level of the driver is equal to or higher than the predetermined level, and that the lightness outside of the autonomous vehicle 1100 is lower than the predetermined lightness. In step S85C, the selection unit 156 may select the recognition unit 04 in accordance with the sixth rule.

After the recognition unit has been selected by the selection unit 156 in the above-described manner in accordance with the predetermined algorithm, the selection information is provided to the information presentation control apparatus 160 (step S87C). In the information presentation control apparatus 160, the presentation control unit 166 obtains driving information corresponding to the selection information and presents the driving information to the driver. For example, if the recognition unit 04 is selected, driving information representing the details of driving that is currently performed (the details of driving that can be performed) by the automated driving system 1150 is presented to the driver in the form of a voice message from a speaker "the steering wheel and brake are operated according to road signs", and also driving information representing the driving action that needs to be performed by the driver (the details of driving that the automated driving system 1150 is not performing) is presented to the driver in the form of a voice message "operate the steering wheel and brake while paying attention to pedestrians and bicycles".

The selection of a recognition unit and the presentation of driving information in accordance with the selection described above with reference to FIGS. 11A to 11O are repeated while the automated driving system 150 of the autonomous vehicle is performing automated driving. Accordingly, the driver is able to be notified of the driving action that needs to be performed by himself/herself.

The manner in which selection information is presented and obtained is not limited to that described above.

For example, the selection judgment criterion information obtained by the selection information obtaining unit 161 may include running location information that is obtained on the basis of map information and that represents a characteristic of a location where the autonomous vehicle is running. The selection judgment criterion information may also include driver condition information. The selection judgment criterion information may further include outside-vehicle-environment information.

The selection information obtaining unit 161 processes the selection judgment criterion information in accordance with the same algorithm as the algorithm used by the selection unit 156. That is, the processes illustrated in FIGS. 11A to 11O may also be performed by the selection information obtaining unit 161 by using the selection judgment criterion information used by the selection unit 156, so as to estimate the recognition unit selected by the selection unit 156 and obtain selection information.

Accordingly, if a change that changes the details of driving performed by the automated driving system 1150 occurs in the running location of the autonomous vehicle 1100, for example, the information presentation control apparatus 160 is able to provide driving information representing the change to the driver. Also, if a change that changes the details of driving performed by the automated driving system 1150 occurs in the physical condition of the driver, for example, the information presentation control apparatus 160 is able to provide driving information representing the change to the driver. Also, if a change that changes the details of driving performed by the automated driving system 1150 occurs in the environment outside of the vehicle, for example, the information presentation control apparatus 160 is able to provide driving information representing the change to the driver.

The resources of the automated driving system 1150 are limited, and thus the automated driving system 1150 is not always able to constantly operate all the sensors and recognition units and to assist driving control or perform driving control on behalf of the driver. Thus, the automated driving performed by the automated driving system 1150 is limited to the driving that can be performed on the basis of the information obtained by the recognition unit selected by the selection unit 156. As described above, the selection of a recognition unit varies according to the automated driving that is to be preferentially performed and that is changed in accordance with the running location, the physical condition of the driver, or the environment outside of the vehicle, as well as the status of apparatuses in the vehicle. The selections of a recognition unit by the selection unit 156 described above with reference to FIGS. 11A to 11O are examples of the selection algorithm for the change, and an embodiment of the present disclosure is not limited to these examples. For example, a combination of running location information, driver condition information, and outside-vehicle-environment information, and the order in which these pieces of information are used are not necessarily the same as those described above.

Other Embodiments

An embodiment and a modification example have been described as examples of techniques disclosed in the present application. However, the techniques according to the present disclosure are not limited to the above-described embodiment and modification example, and are applicable to an embodiment obtained through change, replacement, addition, or omission performed on the embodiment or modification example. Also, a new embodiment may be carried out by combining individual components described above in the embodiment and the modification example. Hereinafter, other embodiments will be described.

The targets recognized by the recognition units 152 are not limited to the above-described examples, that is, a lane, an inter-vehicle distance, a person, and an obstacle. The targets to be recognized may further be categorized, for example, persons may be categorized into juvenile and senior. Alternatively, a specific motion state of a passing body may be recognized, as well as the presence/absence of the passing body, the position of the passing body, the distance to the passing body, or a predicted motion of the passing body. For example, stagger of a passing body or gaze at the screen of a mobile apparatus of a pedestrian may be recognized. Furthermore, a degree of danger in the surroundings of the vehicle may be determined in accordance with the recognition of a person categorized as described above or the recognition of a motion state, the share of driving actions between the system and the driver may be determined in accordance with the degree of danger, and the determination result may be presented as driving information by the presentation device.

Figure 13:
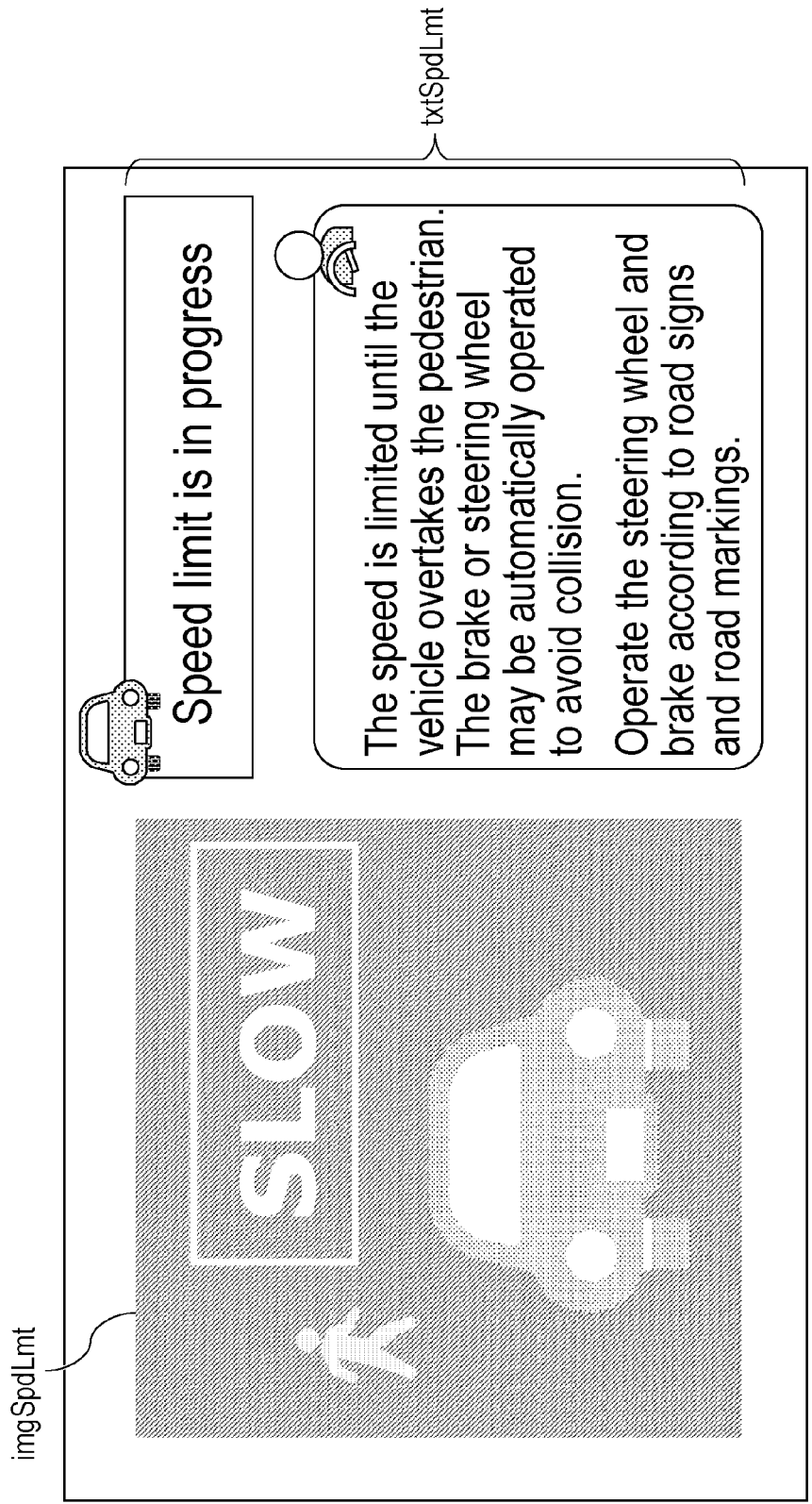
FIG. 13 illustrates an example of driving information presented to a driver by a presentation device in another embodiment.

FIG. 13 illustrates an example of driving information that is displayed on the display device when a pedestrian with a high degree of danger has been recognized. In this example, the selection unit 156 selects the recognition unit 07. In accordance with the selection information representing this selection status, the presentation control unit 166 of the information presentation control apparatus 160 obtains the image data "imgSpdLmt" and the text data "txtSpdLmt" with reference to the table illustrated in FIG. 5 and causes the display device to display the image illustrated in FIG. 13 by using these pieces of data. In this image, both the information about driving by the automated driving system and the information about driving by the driver are presented as driving information.

In the above-described example, the driving information is presented by using only a combination of an image, text, and sound, but may be presented by using only one of them. Alternatively, a sound for attracting attention to change in driving information may be used as well as a voice of reading out the text. Furthermore, a notification through the sense of touch may be used together, such as vibration of the steering wheel or push back of a pedal.

In the above-described examples, the driving information is presented to the driver mainly when there is a change in selection among the in-vehicle recognition units, but the timing to present the driving information is not limited thereto. The driving information may also be presented when the selection is changed from the recognition system 200, which is a recognition unit outside of the vehicle, to an in-vehicle recognition unit. In this case, information may be presented indicating that a result of recognition by the recognition system 200 is not usable due to a communication fault. Because the automated driving control based on recognition by an in-vehicle light-weight recognition unit is more limited in terms of functions, an attention of the driver may be attracted to the situation where there are a few driving support operations performed by the automated driving system, that is, there are many driving actions to be performed by the driver.

According to the description given above, the driving information is presented to the driver when selection of a recognition unit is changed, but the timing to present the driving information is not limited thereto. For example, the driving information may be presented as needed as a response to a request for presenting the driving information that is made by the driver using a predetermined motion or voice through the driving support interface 110.

According to the description given above, a recognition unit is selected in response to detection of an abnormality in the information presentation control apparatus 160. The selection may be performed in accordance with, for example, change in the presence/absence of abnormality. That is, if there is an abnormality, the selection unit 156 may select a recognition unit when the selection unit 156 is notified that there is not the abnormality. Accordingly, for example, if the communication state has recovered or if it is judged from the information received from the vehicle monitoring unit 155 that there is not obstacle that had been attached to the surface of an in-vehicle sensor any more, the selection unit 156 selects a recognition unit. The timing when the selection status of a recognition unit is changed is not limited to the timing at which an abnormality such as a failure is detected, and may be the timing at which the current position of the autonomous vehicle, the environment outside of the vehicle, or the physical condition of the driver is changed, as described above.

Figure 14:
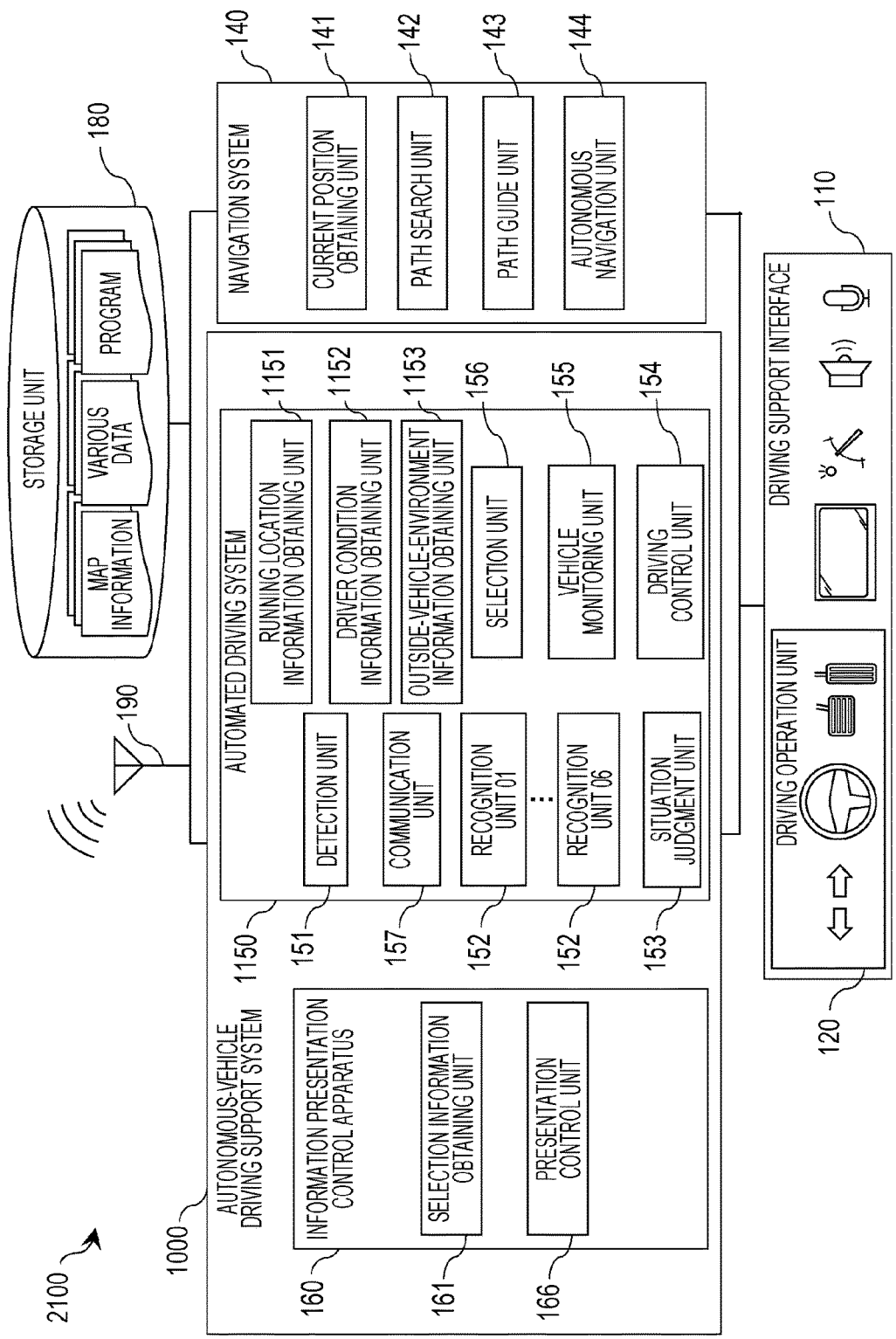
FIG. 14 is a functional block diagram illustrating the functional configuration of an autonomous vehicle including an autonomous-vehicle driving support system according to the other embodiment.

According to an embodiment of the present disclosure, the information presentation control apparatus 160 may be integrated with the navigation system 140 and/or the automated driving system 150 (1150) and may be provided as an autonomous-vehicle driving support system. FIG. 14 is a diagram illustrating the configuration of an autonomous-vehicle driving support system 1000 formed by integrating the automated driving system 1150 and the information presentation control apparatus 160, and an autonomous vehicle 2100 including the autonomous-vehicle driving support system 1000.

An embodiment of the present disclosure may be implemented and provided as the autonomous vehicle 100, 1100, or 2100.

In the above-described embodiments, the individual components may be configured by dedicated hardware or may be implemented by executing a software program suitable for the individual components. The individual components may be implemented when a program execution apparatus such as a central processing unit (CPU) or processor reads a software program recorded on a recording medium such as a hard disk or semiconductor memory and executes the program. Here, the program implementing the information presentation control apparatus according to the above-described embodiments is as follows.

The program causes a computer mounted in an autonomous vehicle to execute a process including: obtaining selection information representing a selection status of a plurality of recognizers that recognize different targets in surroundings of an autonomous vehicle; and causing a presentation device mounted in the autonomous vehicle to present driving information in accordance with the selection information, the driving information being based on at least one of control that is executable by the autonomous vehicle and control that is not executable by the autonomous vehicle and being information about at least one of driving by an automated driving system of the autonomous vehicle and driving by a driver.

The information presentation control apparatus 160, the automated driving system 150 or 1500, or the autonomous-vehicle driving support system 1000 implemented when a program execution apparatus executes a program, and the share of the above-described functions among the functional components of the apparatus or system are merely an example and may be changed. An embodiment carried out by arbitrarily dividing or combining the components and functions is included in the scope of the present disclosure.

The information presentation control apparatus according to one or plural aspects has been described on the basis of embodiments. The present disclosure is not limited to these embodiments. Various modifications of the embodiments that are conceived by those skilled in the art and an embodiment carried out by combining the components in different embodiments may also be included in the scope of one or plural aspects without deviating from the gist of the present disclosure.

The present disclosure is applicable to an autonomous vehicle or the like.

What is claimed is:

1. An information presentation control apparatus, the apparatus comprising a processor and a memory that stores an instruction, the apparatus further comprising, as a configuration when the processor executes the instruction stored in the memory:
   a selection information obtainer that obtains selection information representing a selection status of a plurality of recognizers that recognize different targets in surroundings of an autonomous vehicle; and
   a presentation controller that causes a presentation device mounted in the autonomous vehicle to one of visibly display, audibly emit or tangibly produce driving information in accordance with the selection information, the driving information being:
   information about at least one of:
      driving by an automated driving system of the autonomous vehicle, and
      driving by a driver, and
   based on:
      control that is executable by the autonomous vehicle, and
      control that is not executable by the autonomous vehicle,
   wherein the plurality of recognizers include first recognizers of the autonomous vehicle and a second recognizer external to the autonomous vehicle, and wherein the apparatus further comprises, as a further configuration when the processor further executes the instruction stored in the memory:
a communicator that transmits detection information from a detector of the autonomous vehicle to the second recognizer, and
a monitor that determines whether the communication speed between the communicator and the second recognizer is equal to or greater than a predetermined threshold,
wherein the selection information obtained by the selection information obtainer includes information identifying one or more recognizers, in the plurality of recognizers, which are used to recognize one or more targets in the different targets, and
wherein when it is determined that the communication speed between the communicator and the second recognizer is equal to or greater than a predetermined threshold, the second recognizer is one of the one or more recognizers identified by the information in the obtained the selection information.

2. The information presentation control apparatus according to claim 1, wherein the selection status of the plurality of recognizers is a status of selection of a recognizer that performs recognition of a target or a recognizer that does not perform recognition of a target from among the plurality of recognizers.

3. The information presentation control apparatus according to claim 2, wherein the selection information obtainer obtains, from the automated driving system, the selection information representing a result of selection of a recognizer from among the plurality of recognizers.

4. The information presentation control apparatus according to claim 2, wherein the selection information obtainer obtains selection judgment criterion information that is to be used for judgment for selecting a recognizer from among the plurality of recognizers and obtains the selection information by estimating the selection status on the basis of the selection judgment criterion information.

5. The information presentation control apparatus according to claim 2, wherein the selection information obtainer obtains information representing an operation status of a detector or a communicator included in the autonomous vehicle, the information being for obtaining information used for recognizing a target, and obtains the selection information by judging, on the basis of the information representing the operation status, a recognizer to be selected.

6. The information presentation control apparatus according to claim 4, wherein the selection judgment criterion information includes running location information representing a characteristic of a location where the autonomous vehicle is running, the running location information being obtained on the basis of map information.

7. The information presentation control apparatus according to claim 4, wherein the selection judgment criterion information includes driver condition information representing a physical condition of the driver.

8. The information presentation control apparatus according to claim 4, wherein the selection judgment criterion information includes outside-vehicle-environment information representing an environment outside of the autonomous vehicle.

9. The information presentation control apparatus according to claim 5, wherein
the information representing the operation status includes information representing an abnormality of a sensor included in the detector, and
the recognizer that does not perform recognition of a target includes a recognizer that uses a detection result output from the sensor having the abnormality to recognize a target.

10. The information presentation control apparatus according to claim 5, wherein
the information representing the operation status includes information representing communication quality of the communicator or whether or not the communicator is performing communication, and
the recognizer that does not perform recognition of a target includes a recognizer configured to use information communicated by the communicator to recognize a target in a situation where the communication quality of the communicator is lower than predetermined quality or a situation where the communicator is not performing communication.

11. The information presentation control apparatus according to claim 1, wherein the driving information is information including details of driving that the automated driving system does not perform or is not performing.

12. The information presentation control apparatus according to claim 1, wherein at least one of the selection information obtainer and the presentation controller is performed by the processor.

13. An autonomous-vehicle driving support system, the system comprising a processor and a memory that stores an instruction, the system further comprising, as a configuration when the processor executes the instruction stored in the memory:
an automated driving system that controls execution of driving of an autonomous vehicle based on a recognition result obtained from a recognizer selected from among a plurality of recognizers that recognize different targets in surroundings of the autonomous vehicle; and
an information presentation control apparatus comprising:
a selection information obtainer that obtains selection information representing a selection status of a plurality of recognizers that recognize different targets in surroundings of an autonomous vehicle; and
a presentation controller that causes a presentation device mounted in the autonomous vehicle to one of visibly display, audibly emit or tangibly produce driving information in accordance with the selection information, the driving information being:
information about at least one of:
driving by an automated driving system of the autonomous vehicle, and
driving by a driver, and
based on:
control that is executable by the autonomous vehicle, and
control that is not executable by the autonomous vehicle,
wherein the plurality of recognizers include first recognizers of the autonomous vehicle and a second recognizer external to the autonomous vehicle, and
wherein the system further comprises, as a further configuration when the processor further executes the instruction stored in the memory:
a communicator that transmits detection information from a detector of the autonomous vehicle to the second recognizer, and a monitor that determines whether the communication speed between the communicator and the second recognizer is equal to or greater than a predetermined threshold, wherein the selection information obtained by the selection information obtainer includes information identifying one or more recognizers, in the plurality of recognizers, which are used to recognize one or more targets in the different targets, and wherein when it is determined that the communication speed between the communicator and the second recognizer is equal to or greater than a predetermined threshold, the second recognizer is one of the one or more recognizers identified by the information in the obtained the selection information.

14. An autonomous vehicle comprising:
the autonomous-vehicle driving support system according to claim 13.

15. An information presentation control method comprising:
obtaining selection information representing a selection status of a plurality of recognizers that recognize different targets in surroundings of an autonomous vehicle; and causing a presentation device mounted in the autonomous vehicle to one of visibly display, audibly emit or tangibly produce driving information in accordance with the selection information, the driving information being:

information about at least one of:
driving by an automated driving system of the autonomous vehicle, and
driving by a driver, and based on:
control that is executable by the autonomous vehicle, and
control that is not executable by the autonomous vehicle, wherein the plurality of recognizers include first recognizers of the autonomous vehicle and a second recognizer external to the autonomous vehicle, and wherein the method further comprises:
transmitting detection information from a detector of the autonomous vehicle to the second recognizer, and determining whether the communication speed between the autonomous vehicle communicator and the second recognizer is equal to or greater than a predetermined threshold, wherein the selection information obtained by the selection information obtaining includes information identifying one or more recognizers, in the plurality of recognizers, which are used to recognize one or more targets in the different targets, and wherein when it is determined that the communication speed between autonomous vehicle and the second recognizer is equal to or greater than a predetermined threshold, the second recognizer is one of the one or more recognizers identified by the information in the obtained the selection information.

16. A non-transitory computer-readable recording medium storing a program, the program causing a computer to execute a process comprising:

obtaining selection information representing a selection status of a plurality of recognizers that recognize different targets in surroundings of an autonomous vehicle; and causing a presentation device mounted in the autonomous vehicle to one of visibly display, audibly emit or tangibly produce driving information in accordance with the selection information, the driving information being:

information about at least one of:
driving by an automated driving system of the autonomous vehicle, and
driving by a driver, and based on:
control that is executable by the autonomous vehicle, and
control that is not executable by the autonomous vehicle, wherein the plurality of recognizers include first recognizers of the autonomous vehicle and a second recognizer external to the autonomous vehicle, and wherein the program further causes a computer to execute a further process comprising:
transmitting detection information from a detector of the autonomous vehicle to the second recognizer, and determining whether the communication speed between the autonomous vehicle and the second recognizer is equal to or greater than a predetermined threshold, wherein the selection information obtained by the selection information obtainer includes information identifying one or more recognizers, in the plurality of recognizers, which are used to recognize one or more targets in the different targets, and wherein when it is determined that the communication speed between autonomous vehicle and the second recognizer is equal to or greater than a predetermined threshold, the second recognizer is one of the one or more recognizers identified by the information in the obtained the selection information.

17. The information presentation control apparatus according to claim 1, wherein the apparatus further comprises, as a further configuration when the processor further executes the instruction stored in the memory:

a selector
that controls the communicator to transmit the detection information from the detector of the autonomous vehicle to the second recognizer when it is determined that the communication speed is equal to or greater than the predetermined threshold, and that controls the communicator to
(i) refrain from transmitting the detection information from the detector of the vehicle to the second recognizer, and
(ii) controls the one or more of the first recognizers to recognize one or more targets in the different targets in the surroundings of the vehicle, when it is determined that the communication speed is below the predetermined threshold.

* * * * *